US008634431B1

(12) United States Patent  
Chiang et al.

(10) Patent No.: US 8,634,431 B1
(45) Date of Patent: Jan. 21, 2014

(54) QUALITY OF SERVICE AND FLOW CONTROL ARCHITECTURE FOR A PASSIVE OPTICAL NETWORK

(75) Inventors: John M. Chiang, San Jose, CA (US); Cesar A. Johnston, Sunnyvale, CA (US)

(73) Assignee: Marvell International Ltd., Hamilton (BM)

(*) Notice: Subject to any disclaimer, the term of this patent is extended or adjusted under 35 U.S.C. 154(b) by 1035 days.

(21) Appl. No.: 11/938,717

(22) Filed: Nov. 12, 2007

Related U.S. Application Data

(60) Provisional application No. 60/865,326, filed on Nov. 10, 2006.

(51) Int. Cl.
*H04L 12/28* (2006.01)

(52) U.S. Cl.
USPC .................. 370/412; 370/249; 370/395.21

(58) Field of Classification Search
USPC ............................. 370/249, 395.21
See application file for complete search history.

(56) References Cited

U.S. PATENT DOCUMENTS

| | | | | |
|---|---|---|---|---|
| 6,597,699 B1* | 7/2003 | Ayres | | 370/400 |
| 6,665,495 B1* | 12/2003 | Miles et al. | | 398/54 |
| 6,735,210 B1* | 5/2004 | Lindeborg et al. | | 370/412 |
| 6,757,251 B1* | 6/2004 | Nakaishi | | 370/236.2 |
| 6,941,391 B2 | 9/2005 | Kasper | | |
| 7,002,918 B1* | 2/2006 | Prieto et al. | | 370/252 |
| 7,571,216 B1 | 8/2009 | McRae et al. | | |
| 7,643,753 B2 | 1/2010 | Weitz et al. | | |
| 2004/0017819 A1* | 1/2004 | Kagan et al. | | 370/412 |
| 2004/0141759 A1* | 7/2004 | Stiscia et al. | | 398/168 |
| 2005/0286544 A1* | 12/2005 | Kitchin et al. | | 370/412 |
| 2006/0002686 A1* | 1/2006 | Arima | | 386/96 |
| 2007/0133989 A1 | 6/2007 | Kim et al. | | |
| 2008/0212472 A1* | 9/2008 | Musacchio et al. | | 370/232 |

OTHER PUBLICATIONS

ITU-T Telecommunication Standardization Sector of ITU—G.984.4—Series G: Transmission Systems and Media, Digital Systems and Networks, Digital sections and digital line system—Optical line systems for local and access networks—Gigabit-capable Passive Optical Networks (G-PON): ONT management and control interface specification (2004).

ITU-T Telecommunication Standardization Sector of ITU—G.984.4 Amendment 1, Series G: Transmission Systems and Media, Digital Systems and Networks, Didgital sections and digital line system—Optical line systems for local and access networks—Gigabit-capable Passive Optical Networks (G-PON): ONT management and control interface specification (2005).

(Continued)

*Primary Examiner* — Kibrom T Hailu
*Assistant Examiner* — Zewdu A Beyen

(57) ABSTRACT

In controlling data packet transmission for a passive optical network, a controller provides memory access and flow control of packet data from a host memory to an external optical network device, such as an optical line termination, optical network unit, or optical network termination. The controller is programmed to control packet data flow through the transmission buffer by resizing the transmission buffer to compensate for increases or decreases in bandwidth demand. For example, the transmission buffer may include a plurality of FIFOs, each of a different transmission container type and each capable of having a different bandwidth allocation, which allocation is changed by the controller in response any one of the FIFO's usage levels increasing above a high threshold or decreasing below a low threshold.

22 Claims, 11 Drawing Sheets

(56) References Cited

OTHER PUBLICATIONS

ITU-T Telecommunication Standardization Sector of ITU—G.984.4 Amendment 2—Series G: Transmission Systems and Media, Digital Systems and Networks, Digital sections and digital line system—Optical line systems for local and access networks—Gigabit-capable Passive Optical Networks (G-PON): ONT management and control interface specification (2006).

ITU-T Telecommunication Standardization Sector of ITU G.984.3—Series G: Transmission Systems and Media, Digital Systems and Networks, Digital sections and digital line system—Optical line systems for local and access networks—Gigabit-capable Passive Optical Networks (G-PON): Transmission convergence layer specification (2004).

ITU-T Telecommunication Standardization Sector of ITU G.984.4, Series G: Transmission Systems and Media, Digital Systems and Networks, Digital sections and digital line system—Optical line systems for local and access networks, Gigabit-capable Passive Optical Networks (G-PON): ONT management and control interface specification (2004).

ITU-T Telecommunication Standardization Sector of ITU G.984.4 Amendment 1, Series G: Transmission Systems and Media, Digital Systems and Networks—Digital sections and digital line system—Optical line systems for local and access networks, Gigabit-capable Passive Optical Networks (G-PON): ONT management and control interface specification (2005).

ITU-T Telecommunication Standardization Sector of ITU G.984.4 Amendment 2, Series G: Transmission Systems and Media, Digital Systems and Networks—Digital sections and digital line system—Optical line systems for local and access networks, Gigabit-capable Passive Optical Networks (G-PON): ONT management and control interface specification (2006).

* cited by examiner

QUALITY OF SERVICE AND FLOW CONTROL ARCHITECTURE FOR A PASSIVE OPTICAL NETWORK

CROSS-REFERENCE TO RELATED APPLICATION

The present application claims the benefit of U.S. Provisional Application No. 60/865,326, entitled "QoS and Flow Control Architecture in GPON," filed on Nov. 10, 2006, which is hereby incorporated by reference herein in its entirety.

FIELD OF TECHNOLOGY

The present disclosure relates generally to communication devices, and more particularly, to techniques for controlling quality of service in a passive optical network.

DESCRIPTION OF THE RELATED ART

Point-to-multipoint networks such as passive optical networks (PONs) provide efficient communications (voice, data, telephony, etc.) without substantial power consumption. A typical PON may include an optical line termination (OLT) acting as a network-side broadcast point in communication with multiple optical network units (ONUs) and/or optical network terminations (ONTs) on the user side of the network. An optical fiber or bundle creates the connection between the OLT and the many ONTs/ONUs, where the signals are transmitted on that fiber/bundle using passive optical components (e.g., non-electrically powered).

The OLT provides an interface between the passive optical network and the backbone network of a service provider and is responsible for managing the ONUs/ONTs through the communication of the downstream frame formats. The OLT broadcasts downstream transmissions in a downstream frame format that sets forth various overhead and payload data for the user side of the network. In most cases, that downstream broadcast includes data for each of the ONUs and ONTs. On the reverse path, each ONU and ONT communicates with the OLT through an upstream transmission in the form of an upstream burst frame format. Each ONU and ONT must transmit however in dedicated upstream burst windows timed from the OLT. The downstream transmission for example may include allocation of bandwidth data, ranging information, physical layer operations and maintenance data, and the like in addition to providing downstream content to the ONUs and ONTs.

These PON configurations are often employed for packet and telephony communication application, where quality of service (QoS) abound. QoS generally references the probability that the telecommunication network meets a given traffic contract, and is generally considered, by the International Telecommunications Union (ITU), as the cumulative effect on subscriber satisfaction of all imperfections affecting network operation (e.g., a telephone conversation).

Many things can affect packets as they travel from one point (such as an OLT) to another (such as an ONU or ONT). Pockets may be dropped, for example, by routers when the packets arrive and the router buffers are already full. Some, none or all of the packets might be dropped depending on the state of the network, and it is impossible to determine in advance which of these will occur. And when packets are dropped, the receiving applications must request that the packet data be retransmitted, which can severely delay overall transmission. Another problem is packet delay. It might take a long time for one packet to reach its destination, because the packet gets held up in long queues or takes a less direct route to avoid congestion, while another packet might follow a fast, direct route. Either way, delay is unpredictable. Yet another problem is packet jitter. Packets from the same source will reach the destination with different delays, known as jitter, which can seriously affect the quality of streaming audio and video. Packets may suffer out-of-order delivery problems, as well. When a collection of related packets are routed through the Internet, different packets may take different routes to reach a destination, where each route results in a different delay. The effect is that the packets arrive in a different order to the one in which they were transmitted. This problem necessitates special additional protocols that are responsible for rearranging out-of-order packets to an isochronous state once they reach their destination. Finally, there is the problem of packet error. Sometimes packets are misdirected, or combined together, or corrupted, while en route. The receiver has to detect this and, just as if the packet was dropped, ask the sender to repeat itself.

Quality of service techniques have been developed to address these packet problems. Techniques include over-provisioning, in which a network includes interior links that are considerably faster than access links, such that there is enough bandwidth to handle all traffic in any condition. This technique of course can be quite costly. There are Resource Reservation Protocol (RSVP) applications that request and reserve resources through a network. There are differentiated services such as in an asynchronous transfer mode (ATM) system, where packets are marked according to the type of service they need, and in response to these markings, routers and switches use various queuing strategies to tailor performance to the network requirements, such as VLAN priorities. Other techniques include queuing (e.g., fair queue, FIFO, weighted round robin (WRR), class based WRR, or weighted fair queuing), buffer tuning, congestion avoidance (RED, Weighted Random Early Detection (WRED), tail-drops etc.), and policing and traffic shaping.

There are three different techniques for bandwidth assignment to maintain QoS. First, with normal grant control. The upstream traffic from the ONUs and ONTs to the OLT is transferred in a time slot fashion, and all time slots are shared among the associated ONU/ONT. The OLT controls each upstream transmission from the ONUs/ONTs on a time-slot-by-time-slot basis, by sending data grants in downstream transmission PLOAM cells. Second, with enhanced grant control, the OLT grant generation and distribution is updated whenever a new connection is provisioned on a PON or an existing connection is removed from a PON. This is a static bandwidth assignment method, good for real time traffic but wasted for packet switching traffic. Third, there is Dynamic Bandwidth Assignment (DBA), which improves the efficiency of the PON upstream bandwidth by dynamically adjusting the bandwidth among the ONUs and ONTs In response to ONU burst traffic requirements. With DBA techniques, the operator can add more subscribers to the PON due to more efficient bandwidth use, and the subscribers can enjoy more enhanced service and request peak bandwidth beyond the traditional fixed bandwidth allocation.

Despite these techniques, QoS improvements are still needed particularly at the memory storage end and without requiring large increases in processing and memory requirements.

SUMMARY OF THE DISCLOSURE

In one embodiment, a method of managing flow control of packet data from a host to an optical network device for transmission on an optical network, includes: processing descriptor data received from the host, the descriptor data identifying one or more data packets buffered in the host; writing the one or more data packets identified by the descriptor data to a buffer memory in the optical network device, the buffer memory having a first usage threshold of a first value and a memory allocation size of a second value; monitoring usage status of the buffer memory to determine if memory usage is above the first usage threshold; and in response to the memory usage being above the first usage threshold, increasing the memory allocation size above the second value and increasing the first usage threshold above the first value.

In another embodiment, a method of transmitting packet data from a host, includes: writing the packet data to a buffer memory in a network device external to the host in response to a request for descriptor data stored in the host, the descriptor data being cached in the network device, the buffer memory comprising a plurality of memory caches each capable of receiving a portion of the packet data for transmission, and each memory cache having a bandwidth size; and in response to a quality of service warning signal, adjusting the bandwidth size of at least one of the memory caches.

In yet another embodiment, an apparatus for transmitting data packets stored in an external host memory, including: a cache for storing descriptor data pushed to the cache from the host memory, the descriptor data comprising one or more data packet descriptions each corresponding to one of the data packets to be transmitted; a distributed direct memory access engine coupled to the cache to process the descriptor data stored in the descriptor cache to read a data packet description from the descriptor data; and a data transmission buffer coupled to the host memory for the distributed direct memory access engine to write the data packets corresponding to the read data packet description to the data transmission buffer, wherein the distributed direct memory access engine is configured to: monitor usage status of the data transmission buffer to determine if memory usage is above a high usage threshold for the data transmission buffer; and in response to the memory usage being above the high usage threshold, increase memory allocation size of the data transmission buffer and increase the high usage threshold of the data transmission buffer.

DETAILED DESCRIPTION

Figure 1:
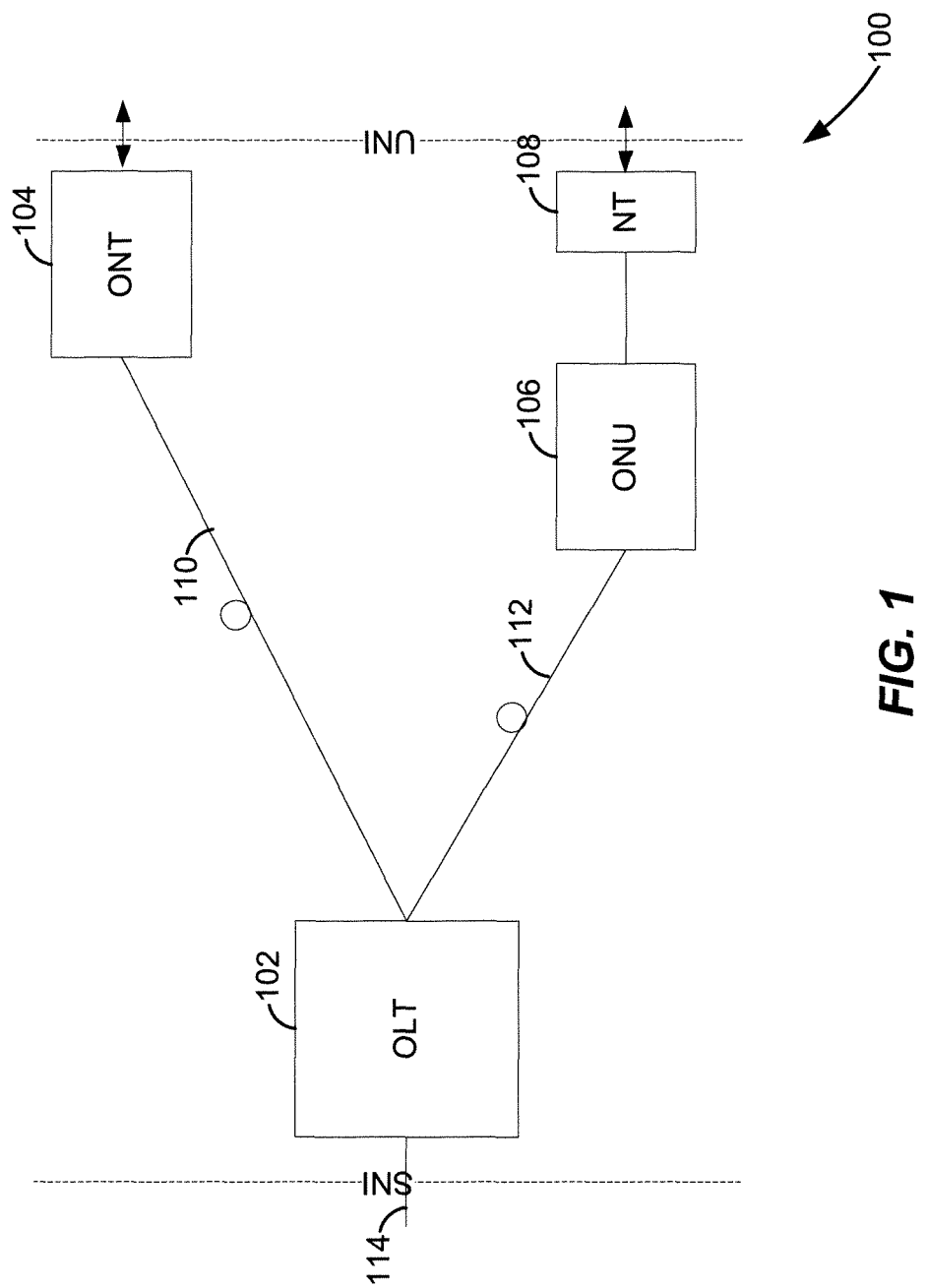
FIG. 1 a block diagram of a passive optical network.

FIG. 1 is a block diagram of an example passive optical network 100 that includes an optical line termination (OLT) 102 coupled to an optical network terminal (ONT) 104 and an optical network unit (ONU) 106. Generally, the passive optical network 100 is a point-to-multipoint network, where the OLT 102 is provided as a service node interface, for example at a server or service provider, such as an interne service provider, television service provider, telephony service provider or other provider of network services. The ONT 104 and/or ONU 106 are each provided as a user node interface, for example at or near an end user. While the OLT 102 may be provided at the service provider site, the OLT 102 may also be provided as one of several OLTs within a distributed network, where each OLT is associated with corresponding ONUs and/or ONTs.

As shown in FIG. 1, the OLT 102 is communicatively coupled to the ONT 104 via an optical fiber 110, and communicatively coupled to the ONU 106 via an optical fiber 112. The optical fibers 110, 112 may be part of an optical distribution network (ODN). Although only one ONT 104 and one ONU 106 are shown to be communicatively coupled to the OLT 102, it should be understood that in a point-to-multipoint optical network, the optical fibers 110, 112 may each run, one-to-one from the OLT 102 to an ONU 106 and ONT 104 where there may be multiple ONTs and/or multiple ONUs in a passive optical network, each of which may, in turn, service multiple end users. As such, a single OLT 102 may service multiple end users on the same or a few optical fibers. As is understood, both the ONT 104 and the ONU 106 operate to terminate the passive optical network 100. An ONT 104 may refer to an integrated unit for an end user that presents the services of the service provider to the end user (e.g., video, data, telephony, etc.). An ONU 106 may be an optoelectronic interface to network termination (NT) equipment 108, where the ONU 106 terminates the passive optical network and the NT equipment 108 provides the services to the end user. The ONU 106 handles data packet conversion between the passive optical network 100 and the NT equipment 108, and the NT equipment 108 may provide an interface to the end user. While this disclosure references both ONTs and ONUs, it should be understood that in the context of this disclosure, ONTs and ONUs may be treated similarly and these terms may be used interchangeably with optical network terminal generally referring to both ONTs and ONUs. Furthermore, the term optical network device as used here collectively includes ONTs, ONUs, and OLTs, or like devices.

Generally, the OLT 102 provides downstream broadcasts to each of the ONTs 104 and each of the ONUs 106 on different dedicated one-to-one fibers, where each ONT 104 and/or ONU 106 individually reads only the content of the transmissions intended for the particular ONT 104 and/or ONU 106. The ONTs 104 and the ONUs 106 provide upstream transmissions to the OLT 102 via their individual fibers. Communications between the OLT 102 and the ONT 104 or ONU 106 generally utilize wavelength division multiplexing with the downstream broadcasts utilizing one wavelength and upstream transmissions utilizing another wavelength. In some examples, the optical fibers 106 and 110 may be compliant with the ITU G.652 standard and support downstream wavelengths between 1480-1500 nm and upstream wavelengths between 1260-1360 nm. For two-fiber downstream systems, the downstream wavelengths may be 1260-1360 nm. Of course, the passive optical networks herein are not limited to a particular wavelength range on downstream or upstream communication. Furthermore, although the passive optical network configuration 100 is described as having one-to-one fibers between the OLT 102 and the ONTs/ONUs 104, 106, it should be understood that multiple fibers may be utilized in the one-to-one correspondence between the OLT 102 and each corresponding ONT/ONU 104, 106. In one example, each connection between the OLT 102 and the ONTs/ONUs 104, 106 may utilize two fibers, with one for upstream transmissions and one for downstream transmission, rather than wavelength division multiplexing signals that share the same fiber.

The OLT 102 provides a variety of functions within the passive optical network 100. At one level, the OLT 102 provides the interface 114 between the passive optical network 100 and a backbone network of the service provider network, which may include supporting time division multiplexed (TDM) protocols at different rates of speed, interne protocol (IP) traffic, asynchronous mode transfer (ATM) protocols, etc. The OLT 102 further facilitates both upstream and downstream communication between the service provider and the ONTs 104 and ONUs 106, and between ONTs 104 and ONUs 106. For example, the OLT 102 allocates upstream bandwidth to the ONTs 104 and ONUs 106 by granting intervals of time (e.g., time slot assignments) to each of the ONTs 104 and ONUs 106 to transmit upstream communications without collisions on the fiber. Upstream bandwidth allocation may be fixed for ONTs 104 or ONUs 106 requiring continuous (e.g., guaranteed) bandwidth availability. For ONTs 104 or ONUs 106 that do not require continuous bandwidth availability (e.g., burst transmissions), the OLT 102 may utilize dynamic bandwidth allocation (DBA) based on either polling bandwidth information from the ONTs 104 and ONUs 106 or based on the occurrence of idle gigabit passive optical network (GPON) encapsulation method (GEM) frames from the ONTs 104 or ONUs 106. In addition, the ONTs 104 and ONUs 106 are typically provided at different distances from the OLT 102, and the OLT 102 utilizes a ranging protocol to equalize the optical path length and equalize the transmission delay between the OLT 102 and the various ONTs 104 and ONUs 106. For example, the OLT 102 may measure the transmission delay for each ONT 104 and ONU 106, and transmits a physical layer operations and maintenance (PLOAM) message to set the transmission delay in the ONT 104 or ONU 106. The OLT 102 further provides centralized media access control (MAC) for the passive optical network 100 for purposes of upstream bandwidth allocation.

Upstream and downstream transmissions between the OLT 102 and the ONTs 104 or ONUs 106 may be performed in a transmission convergence frame format, whereby the transmission data, regardless of the services being provided, is encapsulated in the same type of data packet for transmission over the passive optical network 100. In particular, the transmissions between the OLT 102 and the ONTs 104 or ONUs 106 may take advantage of the gigabit passive optical network (GPON) standard developed by the International Telecommunications Union (ITU). The GPON standard is also known as ITU-T G.984. As is known, the GPON standard generally provides greater security as compared to previous standards, greater bandwidth, larger variable-width data packets, higher data rates and supports various Layer 2 protocols including ATM, Ethernet and GPON encapsulation method (GEM).

Although the disclosure generally refers to a gigabit passive optical network (GPON), it should be understood that all or part of this disclosure may be equally applicable to, or supportive of, previous-generation passive optical network standards, such as asynchronous transfer mode (ATM) passive optical network (APON) and broadband passive optical network (BPON), current passive optical network standards, such as Ethernet passive optical network (EPON), and future passive optical network standards, such as wavelength division multiplex passive optical network (WDM-PON). The disclosure may also be equally applicable to variations on the GPON standard.

Figure 2:
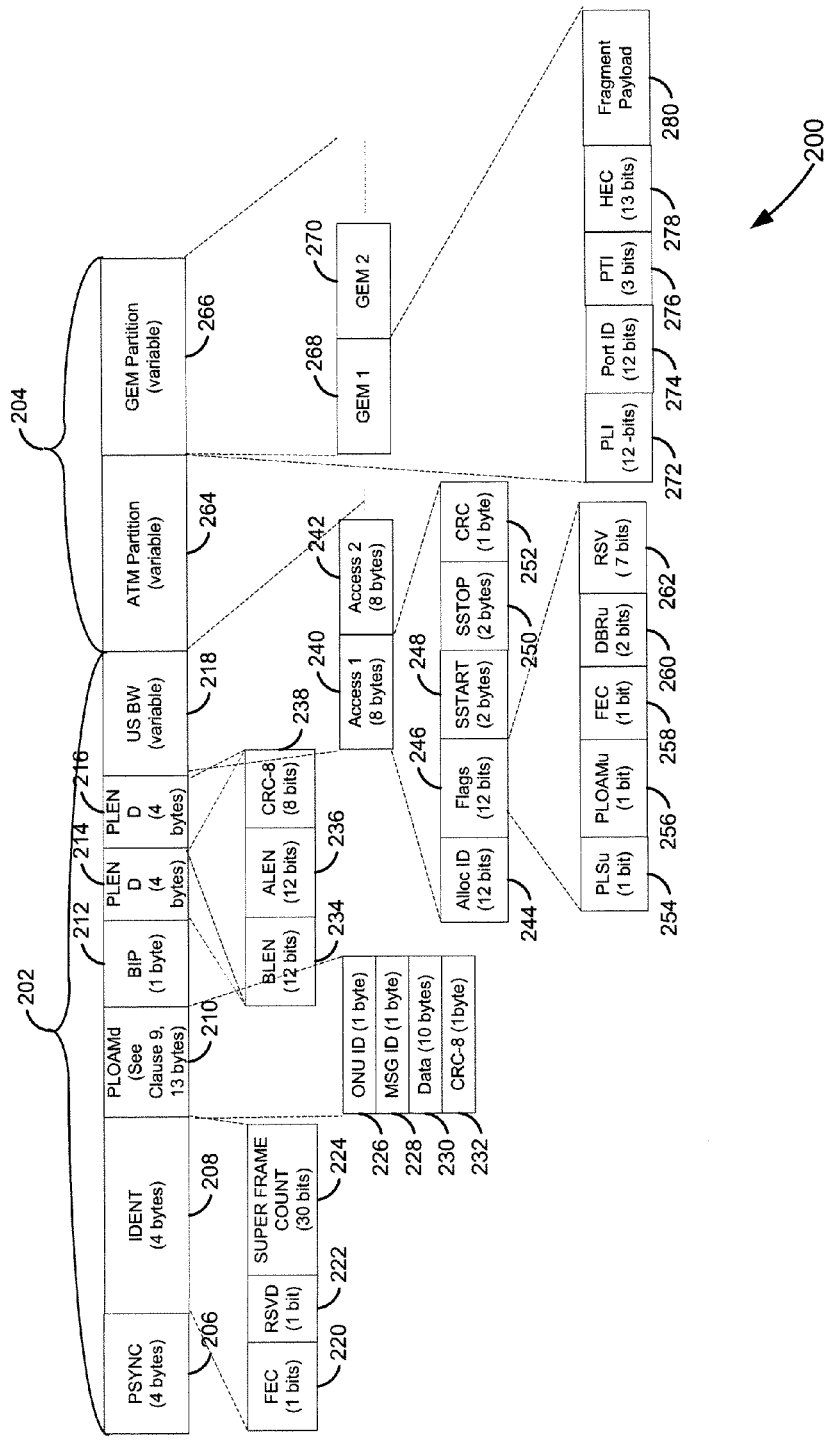
FIG. 2 is a schematic diagram of a downstream gigabit passive optical network transmission convergence frame format.

FIG. 2 is an example of a downstream transmission convergence layer (TC-Layer) frame format 200 using the GPON standard and which may be utilized for downstream transmissions from the OLT 102 to the ONTs 104 and ONUs 106. The downstream frame format 200 generally includes an overhead field 202 and a payload field 204, where the overhead field 202 includes several sub-fields to be assembled by the OLT 102 and the payload field 204 includes the information being sent to the ONT 104 or ONU 106 (e.g., service data). As indicated above, the data for the payload field 204 may be provided in one or more transport formats, such as ATM or GEM, and as a variable length data packet. As also indicated above, while the following disclosure involves an example of the downstream transmission convergence layer (TC-Layer) frame format 200, as well as the subsequent upstream transmission convergence layer (TC-Layer) frame format discussed further below, it should be understood that variations of the downstream and upstream formats may occur and the disclosure is not limited to the particulars examples given herein.

The overhead field 202 for the downstream transmission frame may be referred to as the physical control block downstream (PCBd), and may include a physical synchronization (PSYNC) field 206, an identification (Ident) field 208, a physical layer operations and maintenance downstream (PLOAMd) field 210, a bit interleaved parity (BIP) field 212, two payload length downstream (PLEND) fields 214, 216 and an upstream bandwidth map (US BWmap) field 218. The PSYNC field 206 is a fixed pattern that generally begins the overhead field 202, such that an ONT or ONU may use the PSYNC field 206 to identify the beginning of the frame 200 and establish synchronization with the downstream transmission. When the ONT 104 or ONU 106 finds the PSYNC field 206 within a frame of a downstream transmission from the OLT 102, the ONT/ONU 104, 106 may utilize a synchronization state machine, or other synchronization method, and search for other PSYNC fields 206 within subsequent frames to establish and monitor the synchronization state with the transmission. In one example, a counter may be set upon identifying a unique value in the PSYNC field 206, with the counter being incremented for each valid PSYNC filed 206 read by the ONT/ONU 104, 106. Once the counter reaches a predetermined threshold, the ONT/ONU 104, 106 is able to enter into a synchronization state whereby the ONT/ONU 104, 106 is in synchronization with the downstream transmission rate. The ONT/ONU 104, 106 may thereby determine it has discovered the downstream frame structure and begin to process the overhead information. The ONT/ONU 104, 106 may also maintain a count for invalid or incorrect PSYNC fields 206, and if the incorrect count reaches a predetermined threshold, the ONT/ONU 104, 106 may determine that it has lost the downstream frame structure and repeat the search for a valid or correct PSYNC field 206. However, it should be understood that different state machines or different manners of establishing and monitoring synchronization with the transmission may be utilized.

The Ident field 208 may be used to indicate large frame structures (superframes) within the downstream transmission frame, and which may be used to data encryption and to provide lower rate synchronization reference signals. Generally, the Ident field 208 includes an FEC field 220, a reserved field 222 and a superframe counter 224. The FEC field 220 indicates whether forward error correction (FEC) is being enabled on the present downstream frame and may be used for FEC control. As is known, forward error correction is a method of error control for transmissions, where the OLT 102 may add redundant data to the downstream transmission frame, and the ONT/ONU 104, 106 may detect and correct errors using the redundant data, thereby avoiding retransmission of the downstream transmission frame from the OLT 102. The reserved field 222 is reserved for other purposes, and the superframe counter 224 provides error checking for potnential dropped frames. The ONT/ONU 104, 106 loads the superframe counter value and compares its local expected value with the superframe counter value, whereby a match indicates correct synchronization and a mismatch indicates a transmission error or desynchronization.

The PLOAMd field 210 contains a downstream PLOAM message from the OLT 102 for the ONT/ONU 104, 106. A PLOAM message is generally a control message that may relate to a variety of information or instructions for the ONT/ONU 104, 106, including, but not limited to, alerts, activation-related messages, instructions, etc. For example, an Upstream_Overhead PLOAM message may instruct the ONT/ONU 104, 106 to use a particular preassigned equalization delay during ranging and number of preamble bytes for upstream transmissions, define the transmission power of the ONT/ONU 104, 106 and the number of serial number transmissions per serial number request. A Serial_number_mask PLOAM message may provide a serial number and a mask for part of the serial number. An Assign_ONU-ID PLOAM message may assign an identification with the serial number of the ONT/ONU 104, 106. A Ranging_Time PLOAM message may provide a value for an equalization delay register of the ONT/ONU 104, 106. A Deactivate_ONU-ID PLOAM message may provide a deactivation/reset instruction to stop sending upstream transmissions. A Disable_serial_number PLOAM message may provide a disable/enable instruction to the ONT/ONU 104, 106. A Configure_VP/VC PLOAM message may activate or deactivate a virtual channel or a virtual path at the ATM layer. An Encrypted_Port-ID/VPI PLOAM message may indicate encrypted and unencrypted channels to the ONT/ONU. A Request_password PLOAM message may request a password from the ONT/ONU for verification. An Assign_Alloc-ID PLOAM message may assign an allocation identification to the ONT/ONU 104, 106. A POPUP PLOAM message may instruct the ONT/ONU 104, 106 to move to a ranging state or an operation state. A Request_Key PLOAM message may trigger the ONT/ONU 104, 106 to generate a new encryption key. A Configure Port-ID PLOAM message may link a management and control interface of the ONT/ONU 104, 106 (OMCI) with a Port-ID which may be appended to an overhead of GEM encapsulated payload to be used as an addressing mechanism to route the OMCI over the GEM channel. A PEE-Physical Equipment Error PLOAM message to indicate that the OLT is unable to sent both ATM cells, GEM frames and ONT/ONU Management and Control Channel (OMCC). A Change-Power-Level PLOAM message may trigger the ONT/ONU 104, 106 to increase or decrease it transmission power level. A PST (PON Section Trace) PLOAM message may be provided to check the connectivity between the ONT/ONU and the OLT, and to perform Automatic Protective Switching (APS). A BER interval PLOAM message may be provided to define the accumulation interval per ONT/ONU 104, 106 expressed as a number of downstream frames for the ONT/ONU 104, 106 counting the number of downstream bit errors. A Key Switching Time PLOAM message may indicate when the ONT/ONU 104, 106 when to begin using a new encryption key.

As seen in FIG. 2, the PLOAMd field 210 is formatted to include an ONU ID 226, a Message-ID 228, the message Data 230 and a cyclic redundancy check (CRC) 232. The ONU ID 226 identifies the ONT/ONU 104, 106 to receive the PLOAM message. The Message-ID 228 identifies the type of PLOAM message, example of which is provided above. The message Data 230 is used for the payload of the PLOAM message. The CRC 232 is a frame check sequence, such that the PLOAM message may be discarded upon receipt if the CRC is incorrect.

The BIP field 212 contains the bit interleaved parity of the bytes that have been transmitted since the previous BIP. The ONT/ONU 104, 106 independently determined the BIP and compares the result to the BIP field 212 to measure the number of errors in the transmission.

The Plend field 214, 216 specifies the length of the bandwidth map (BWmap) (also referred to as the bandwidth allocation) and any ATM partition in the payload 202. More specifically, the BWmap length is provided in a Blen field 234, and the ATM partition length related information is provided in an Alen field 236. As seen in FIG. 2, the Plend fields 214, 216 are redundant fields for error robustness. The Plend fields 214, 216 may be protected by CRC (e.g., CRC-8) for error detection and correction as provide in a CRC field 238. In particular, the length of the bandwidth map provides the limit of the number of allocation IDs that may be granted in any particular duration in any 125 microsecond duration up to 4095. The actual length of the BWmap field 218 is then 8 times the Blen value. The Alen field 236 may allow up to a particular number of ATM cells in a frame (e.g., a 12-bit Alen field allows 4095 ATM cells), up to a particular data rate (e.g., 10 Gbits/s). The length of the ATM partition is then 53 times Alen. The ONT/ONU 104, 106 implements the error detection and correcting functions of the CRC field 238, decodes both copies of the Plend field 214, 216, and uses the best copy based upon the result of the CRC detection process (e.g., the copy that is error free or that has a correctible error).

The US BWmap field 218 provides an upstream bandwidth allocation as processed by the OLT acting as the main or central controller for the ONTs 104 and ONUs 106. The BWmap field is provided as an array of allocation structures 240, 242 (Access 1, Access 2, etc.), where each entry in the array represehts a single bandwidth allocation to a particular transmission container (T-CONT). The number of entries in the BW map is provided in the Plend field 214, 216. The access fields are distributed to the ONTs/ONUs 104, 106 which become slaves to the OLT and are required to follow the provided format.

As shown in FIG. 2, each allocation structure 240, 242 includes an Alloc ID field 244, a Flags field 246, a SSTART field 248, a SSTOP field 250 and a CRC field 252. The Alloc ID field 244 indicated the particular T-CONT that is being granted time on the upstream, and includes an address of the ONT/ONU 104, 106 receiving the T-CONT.

The Flags field 246 contains five separate indications on how the allocation should be used by the ONT/ONU 104, 106, including information to be sent back to the OLT during the bandwidth allocation provided to the ONT/ONU 104, 106. The Flags field 246 includes a PLSu field 254, a PLOAMu field 256, an FEC field 258, a DBRu field 260 and an RSV field 262. The PLSu field 254 is a power leveling sequence used for power control measurements by the ONT/ONU 104, 106 which, if set, directs the ONT/ONU 104, 106 to send its PLSu information during the bandwidth associated allocation. If the PLSu bit is not set, the ONT/ONU 104, 106 does not send its PLSu information for the associated bandwidth allocation. The power control measurements function allows for adjustment of the power levels of the ONT/ONU 104, 106 to reduce the optical dynamic range as seen by the OLT, and is useful in initial power set-up of the ONT/ONU 104, 106 (e.g., during activation), and power mode change of the ONT/ONU 104, 106 transmitter (e.g., during activation or operation). The PLOAMu field 256 directs the ONT/ONU 104, 106 to send its PLOAMu information during the associated bandwidth allocation, if the bit is set. Examples of the PLOAM messages are discussed above. The FEC field 258 causes the ONT/ONU 104, 106 to compute and insert an FEC parity during the associated bandwidth allocation, if the bit is set. The DBRu field 260 causes the ONT/ONU 104, 106 to send an upstream Dynamic Bandwidth Report indicating the number of cells or blocks in the T-CONT buffer of the ONT/ONU 104, 106, whereby the OLT 102 may determine the congestion status of each T-CONT. The RSV field 262 is reserved for future use.

The SSTART field 248 is the start time field indicating the starting time for upstream transmission (i.e., the starting time of the bandwidth allocation). The SSTOP field 250 is the stop time field indication the stop time for the upstream transmission. Each ONT/ONU 104, 106 uses the SSTART and SSTOP fields 248, 250 to determine when to start and stop its upstream transmission. Each ONT/ONU 104, 106 identifies which particular information among the allocation structures is for its own use as filtered through the Allocation_ID 244 bits within the access portion of the frame. The CRC field 252 is a cyclic redundancy check (e.g., CRC-8) that protects the allocation structure, and where the ONT/ONU 104, 106 of the BWmap field 218 processing implements error detecting and correcting functions of the CRC. If an uncorrectable error occurs as indicated by the CRC function, the allocation structure is discarded.

The transmission convergence payload field 204 may include both an ATM payload field 264 or partition, and a GEM payload field 266 or partition. As such, a variety of user data type may be carried in the GPON transmission convergence payload. The ATM partition 264 may contain a number of ATM cells, the length of which is provided in the Plend/Alen fields 214/236, 216/236. The OLT 102 may allocate as many cell durations as needed in the downstream, including almost the entire downstream frame. Generally, the ATM partition 264 is an integer multiple of 53 bytes long based upon the Plend/Alen fields 214/236, 216/236, and the ATM cells are aligned to the partition. The downstream cell stream is filtered at the ONT/ONU 104, 106 based upon a virtual path identifier (VPI), referenced above. In particular, each ONT/ONU 104, 106 is configured to recognize which VPI belongs to it, and ATM cells that belong to the ONT/ONU 104, 106 are passed on to the ATM client process.

The GEM partition 266 contains a variable number of GEM frame-mode delineated frames 268, 270 (GEM1, GEM2, etc.). The length of the GEM partition 266 is determined based on whatever remains after the overhead 202 and ATM partitions 264 are subtracted from the overall frame length. The GEM protocol provides delineation of the user data frame (either going to or coming from a user) and provides port identification for multiplexing. Delineation and port identification are accomplished by the GEM header discussed below. The delineation process uses the GEM header at the beginning of every downstream GEM partition and every upstream GEM payload. As such, in a downstream transmission the ONT/ONU 104, 106 is assured of finding the first header and may find subsequent headers using the payload length identified (PLI) as a pointer.

As seen in FIG. 2, each GEM frame 268, 270 includes a header containing a payload length indicator (PLI) field 272, a Port-ID field 274, a payload type indicator (PTI) field 276, HEC field 278, and a fragment payload 280. The PLI field 272 indicates the length of the fragment payload 280 following the header, and is used to identify the next header in the GEM stream to provide delineation. The size of the PLI field 272 (e.g., 12-bits) determines the size of the GEM fragments (e.g., up to 4095 bytes), where data frames larger than the GEM fragment payload size are fragmented into smaller sizes to accommodate the GEM fragment payload size. The Port-ID field 274 is a unique traffic identifier on the passive optical network 100 to provide traffic multiplexing. The PTI field 276 indicates the content type of the fragment payload 280 and how the fragment payload 280 should be treated (e.g., user data fragment; congestion has or has not occurred; end or not end of a frame). The PTI field 276 may be similar to that used in the ATM header. The PTI field 276 indicates which fragment contains the end of the user data frame. The downstream frame transmission is filtered at the ONT/ONU 104, 106 based upon the Port-ID field 274 contained in each GEM fragment. Frames belonging to the ONT/ONU 104, 106, each of which are configured to recognize which Port-IDs belong to it, are passed on to the GEM client process.

The HEC field 278 contains header error control that provides error detection and correction functions for the GEM header. The GEM header may be provided at the beginning of each downstream GEM payload and the ONT/ONU 104, 106 uses the PLI field 272 to find the first header, and finds subsequent headers using the PLI as a pointer. The ONT/ONU 104, 106 may thereby transition to the "sync" state at the beginning of each partition and payload. If uncorrectable errors occur in the header as determined based on the HEC field 278, delineation of the GEM partition may lose synchronization with the data stream, and the ONT/ONU 104, 106 attempts to reacquire synchronization. The ONT/ONU 104, 106 searches for a GEM header HEC field 278, and when one is found, the ONT/ONU 104, 106 transitions to a pre-synchronized state, where it looks for the HEC field 278 at the location indicated in the previously found header. If the HEC matches, then the transition is made to the synchronized state. If it does not match, then the transition is made to the search for another HEC.

Figure 3:
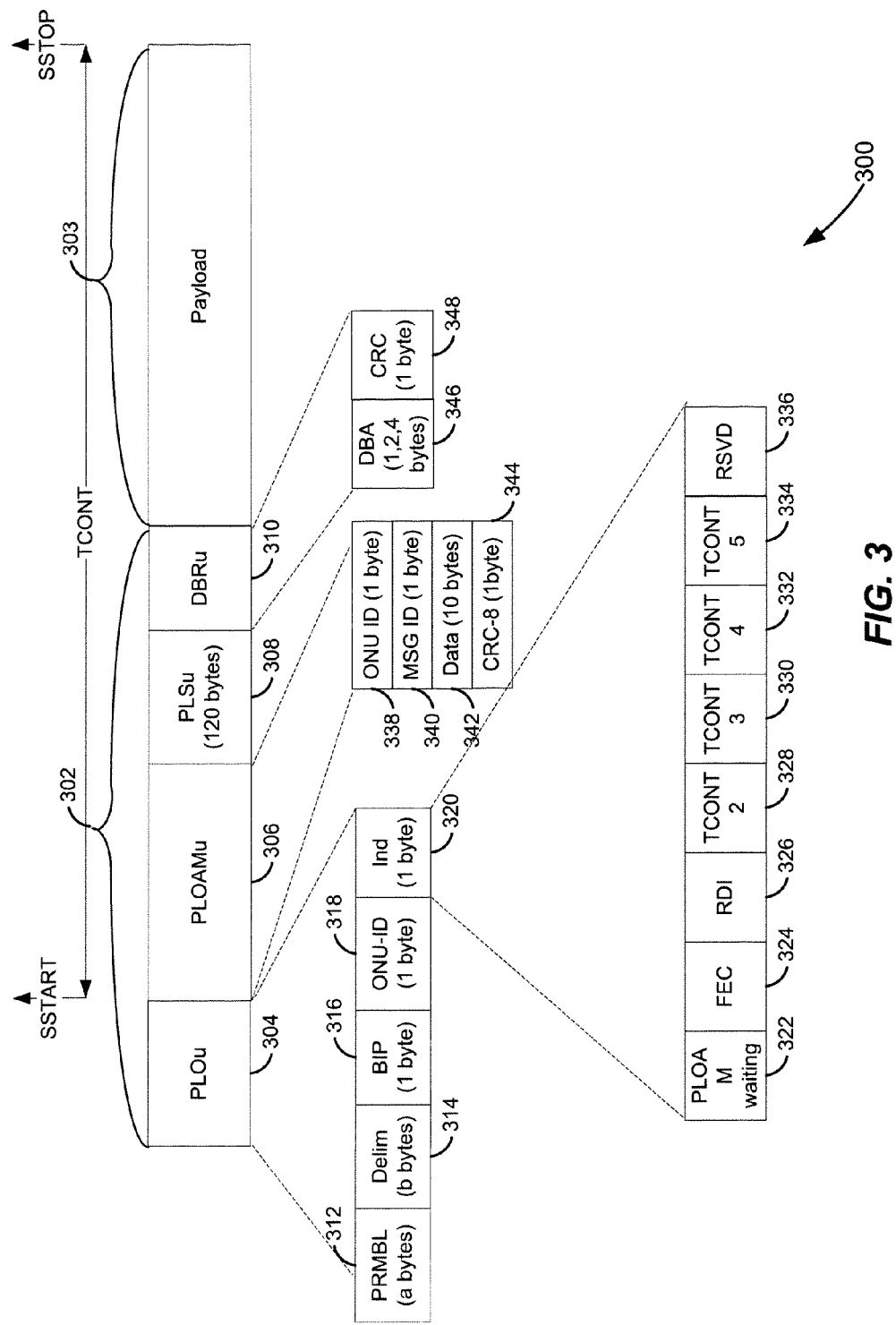
FIG. 3 is a schematic diagram of an upstream gigabit passive optical network transmission convergence frame format.

FIG. 3 is an example of an upstream transmission convergence layer (TC-Layer) frame format 300 using the GPON standard and which may be utilized for upstream transmissions from the ONTs 104 and/or ONUs 106 to the OLT 102. The upstream frame format 300 generally includes an overhead field 302 and a payload field 303. The overhead field 302 includes several sub-fields to be assembled by the ONT/ONU and processed by the OLT 102 and the payload field 303 includes the information being sent to the OLT 102 or to the service provider network. As indicated above, the data for the payload field 303 may be provided in one or more transport formats, such as ATM or GEM, and as a variable length data packet. The frame length of the upstream transmission convergence layer (TC-Layer) frame format 300 may be the same as that of the downstream transmission convergence layer (TC-Layer) frame format 200 for all transmission rates. Each frame may contain a number of transmissions from one or more ONTs/ONUs 104, 106, where the BWmap defines the arrangement of the transmissions. As seen in FIG. 3, the T-CONT of the upstream message is defined by the start and stop transmission times (SSTART and SSTOP) as determined by the OLT 102 during the downstream transmission, but does not include the PLOu field which is sent immediately prior to the start time pointer SSTART.

The overhead field 302 for the upstream transmission frame may include various types of overheads, including physical layer overhead (PLOu) 304, physical layer operations and management upstream (PLOAMu) 306, power leveling sequence upstream (PLSu) 308 and dynamic bandwidth report upstream (DBRu) 310. As discussed above, the Flag field 246 in the downstream transmission assembled by the OLT 102 indicates whether PLOAMu, PLSu or DBRu information should be sent from the ONT/ONU 104, 106 on each bandwidth allocation. The upstream frame is generally scrambled, and may be scrambled using a frame-synchronous scrambling polynomial.

The PLOu field 304 includes the physical layer overhead, which is provided as a preamble (PRMBL) field 312 and a delimiter (Delim) field 314. Three additional fields of data corresponding to the ONT/ONU 104, 106 as a whole are also provided: a bit interleaved parity (BIP) field 316, an ONT/ONU 104, 106 identification (ONU-ID) field 318 and an indication (Ind) field 320. The above data is generally provided at the beginning on any transmission burst from an ONT/ONU 104, 106. The status of the PLOu information is given by the arrangement of the bandwidth allocations. Every time an ONT/ONU 104, 106 takes over the passive optical network 100 from another ONT/ONU 104, 106, the ONT/ONU 104, 106 sends a new copy of the PLOu data. The GPON transmission convergence layer sources the PLOu 304. The preamble field 312 is used to synchronize the OLT 102 to the incoming message, and the delimiter field 314 is used by the OLT 102 to identify where the first bit of important information in the frame begins. The preamble field 312 and the delimiter field 314 are formed as determined by the OLT 102 in the Upstream_Overhead PLOAM message discussed above. As seen in FIG. 3, the preamble and delimiter fields 312, 314 are transmitted before the allocation start time SSTART pointer, as previously dictated by the OLT 102.

The BIP field 316 contains the bit interleaved parity of the bytes transmitted since the last BIP from the transmitting ONT/ONU 104, 106, excluding those of the preamble and delimiter fields 312, 314. The OLT 102 computes the bit-interleaved parity for each ONT/ONU 104, 106 burst, and compares the result to the BIP of the BIP field 316 to measure the number of errors in the link. The ONU-ID field 318 contains the unique identification of the transmitting ONT/ONU 104, 106. The ONU-ID is generally assigned to the ONT/ONU 104, 106 during the ranging process.

The Ind field 320 provides a real-time ONT/ONU status report to the OLT. As shown in FIG. 3, the Ind field 320 is provided as a PLOAM waiting field 322 indicating if one or more PLOAM messages are waiting, an FEC field 324 indicating if forward error correction is enabled or not, a remote defect indication (RDI) field 326 indicating if a defect occurred or not, traffic waiting indicator fields for type 2 T-CONTs 328, type 3 T-CONTs 330, type 4 T-CONTs 332 and type 5 T-CONTs 334, as well as reserved bits 336. If the PLOAM waiting field 322 indicates an urgent PLOAM message is waiting, the OLT 102 may issue an upstream allocation that allows the ONT/ONU 104, 106 to send the PLOAM message in a timely manner. Further uses of the Ind field 320, and in particular the T-CONT fields 328, 330, 332, 334, are discussed below in relation to the DBRu field 310.

Examples of the PLOAM messages as provided in the PLOAMu field 306 are discussed above, and may be provided by the transmitting ONT/ONU 104, 106 in response to a corresponding request from the OLT 102. In particular, the PLOAMu field 306 may only be sent when indicated by the Flags field 246. The PLOAMu field 306 may have a similar structure as the PLOAMd field 210, including an ONU ID 338 of the transmitting ONT/ONU 104, 106, a Message-ID 340 identifying the type of PLOAM message, the message Data 342 for the payload of the message, and a cyclic redundancy check (CRC) 344 to detect and correct errors in the header fields 338, 340, 342.

The PLSu field 308 is used for power control measurements by the ONT/ONU and adjusts the ONT/ONU 104, 106 power levels to reduce the optical dynamic range seen by the OLT 102. The content of the PLSu field 308 is generally set by the ONT/ONU 104, 106, and is sent by the ONT/ONU 104, 106 when indicated in the Flags field 246 of a downstream transmission from the OLT 102. For example, the OLT 102 may set the PLSu bit on broadcast allocation to allow the ONT/ONU 104, 106 to use set up its transmitter during the activation process. If the ONT/ONU 104, 106 does not use the PLSu field 308, the ONT/ONU 104, 106 may deactivate its transmitter for that time. During operation of the ONT/ONU 104, 106, the ONT/ONU 104, 106 generally transmits following the PLSu, such that the ONT/ONU 104, 106 sends the PLSu when it is requested by the OLT 102 regardless of any need to perform transmitter adjustment.

The DBRu field 310 includes information that is associated with the T-CONT entity, rather than the ONT/ONU 104, 106. The DBRu field 310 is sent when requested by the OLT 102 in the Flags field 246 of a downstream transmission. The DBRu field 310 includes a dynamic bandwidth allocation (DBA) field 346 and a CRC field 348. The DBA field 346 contains the traffic status of the particular T-CONT, and may be used by the OLT 102 for bandwidth allocation for the ONT/ONU 104, 106. DBA may be supported via status reporting and OLT traffic monitoring for those ONTs/ONUs 104, 106 that do not report status. Status reporting DBA may be provided as status indications in the PLOu, in the DBRu as shown in FIG. 3, or in an ONU report in a DBA payload.

Status indications may be carried as four bits in the PLOu Ind field 320, and provide a report for each type of T-CONT 328, 330, 332, 334. Each bit may correspond to a different T-CONT type. If a bit is set for a particular T-CONT type 328, 330, 332, 334, the OLT 102 may assume there is some data waiting in one of the T-CONT buffers of that type. It is noted that T-CONT types 2, 3 and 4 328, 330, 332 may not have a fixed bandwidth component and any data waiting in those T-CONTs 328, 330, 332 causes the corresponding indicator to be set, whereas a T-CONT type 5 field 334 buffer may contain data belonging to a fixed bandwidth such that the presence of non-fixed bandwidth sets the corresponding indicator. The status indications provide an early warning to the OLT 102 that data is waiting, though it is not required that the OLT DBA algorithm wait for such indications before allocating bandwidth to the ONT/ONU 104, 106 in order to avoid unnecessary delays. The OLT 102 may use the status indications for a fast alert that DBA supervision may be needed at the ONT/ONU 104, 106 without identifying the T-CONT 328, 330, 332, 334 or bandwidth detail.

Status reporting DBA in the DBRu field 310, shown in FIG. 3 as the DBA field 346, provides a continuous update of the traffic status of a particular T-CONT and is carried in the DBRu field 310 associated with the T-CONT. The status report in the DBA field 346 specifies the amount of data waiting in the T-CONT buffer corresponding to the allocation identification (Alloc-ID) that triggered the DBRu transmission. The OLT 102 may trigger the transmission of the DBRu by setting the DBRu field 260 in the Flags field 246 of a downstream transmission. The CRC field 348 protects the report in the DBA field 346 and DBRu structure with error correction and detection. The OLT may implement the error detecting and correcting functions associated with the CRC field 348 (e.g., CRC-8). If the CRC function indicates an uncorrectable error, the information in the DBRu field 310 may be discarded.

An ONU report in a DBA payload allows for the ONT/ONU 104, 106 to send a DBA report on any T-CONT in the transmission, and is carried in a dedicated DBA payload partition allocated by the OLT in the upstream. The ONT/ONU 104, 106 may select the T-CONT that is the subject of the report, and allows the OLT 102 to schedule a DBA payload which is generally smaller that that required to report on all the T-CONTs in the ONT/ONU 104, 106.

The upstream payload field 303 may be used to carry ATM cells, GEM-delineated frames or DBA reports. The ATM upstream payload includes a number of ATM cells from the ONT/ONU 104, 106 to the OLT 102, and the length of the payload is given by the duration of the allocation minus the size of any requested overhead. The ONT/ONU may buffer the ATM cells as are they are provided by the OLT 102 and send them in a burst during the allocated time. The OLT 102 receives the ATM cells, and may multiplex them with other bursts from other ONTs/ONUs 104, 106 and pass them to the OLT ATM client. The GEM payload contains any number of GEM frame-mode delineated frames, and the length of the payload is also given by the duration of the allocation minus the size of any requested overhead. The GEM protocol provides delineation of the user data frame (either going to or coming from a user) and provides port identification for multiplexing. As discussed above, delineation and port identification are accomplished by a GEM header, where the delineation process uses the GEM header at the beginning of every upstream GEM payload. As such, in an upstream transmission the OLT 102 is assured of finding the first header and may find subsequent headers using the PLI as a pointer. The DBA payload is discussed above, and contains a group of dynamic bandwidth allocation reports from the ONT/ONU 104, 106.

Figure 4:
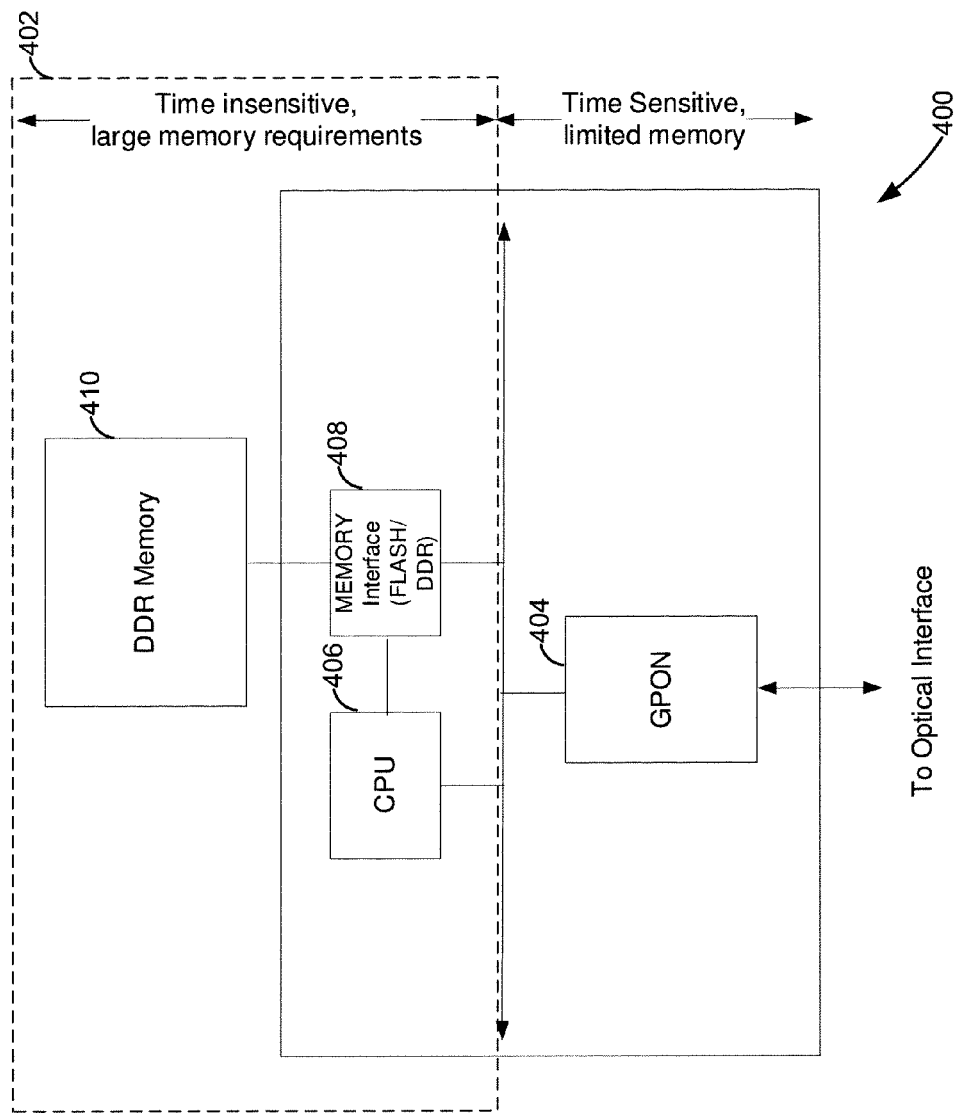
FIG. 4 is a high level block diagram of an example architecture of an integrated circuit within a passive optical network device, such as may be used for an optical line termination device, optical network unit device, or an optical network termination device

FIG. 4 is a block diagram indicating an example of a general architecture 400 that may be implemented in the OLT 102, the ONT 104, or the ONU 106 to divide and execute time sensitive functions from non-time sensitive functions. Generally, the architecture 400 includes a sub-system 402 which may be used to execute non-time sensitive functions, such as those that require large memory requirements, and integrated circuits 404 having an embedded processor for performing time-sensitive functions, such as those that may only need limited memory. Time-sensitive versus non-time sensitive functions may be determined based on time threshold or response threshold requirements for processing the functions. For example, some functions, such as Media Access Control (MAC), may require immediate response (i.e., fast response threshold, time sensitive), whereas other functions, such as TCP/IP routing or packet processing, may not require an immediate response (i.e., non-time sensitive). It is recognized that in practice the actual response time for some non-time sensitive functions may be comparable to the response time threshold of time-sensitive functions. However, it should be understood that it is the response time requirements (e.g., time threshold requirements) that establish whether a function is time-sensitive or not, rather than the actual response time seen in practice. As such, the time threshold requirements delineating between time-sensitive and non-time sensitive are not necessarily predetermined or static, but are rather based on the allowable response time for executing the function. The integrated circuit 404 is described in example implementations further below and it is noted that the memory storage on the circuit may be achieved entirely by small memory modules, such as first in first out (FIFO) memory buffers, and of sufficient size to store packet data as it is received.

The subassembly 402 may be provided as part of a system-on-a-chip (SoC) which may be re-usable for a variety of different implementations, including implementation of different integrated circuits as discussed below. As such, the subassembly 402 may provide a "snap-and-run" architecture in which a variety of chips may be coupled to the subassembly 402, and the subassembly 402 is not limited to OLTs 102, ONTs 104 or ONUs 106, much less the example provided herein. The subassembly 402 may therefore be used to reduce the time-to-market chip assembly, as it can be used among a variety of chip designs and to build different chips.

Generally, the subassembly 402 includes an SoC processor 406 for processing the non-time sensitive functions and a memory interface 408 coupled to the SoC processor 406. A memory 410 is further provided and coupled to the memory interface 408 for buffering data from the integrated circuits 404 (e.g., packet buffering) and may include embedded memory management. The memory 410 thereby stores data for execution of non-time sensitive functions to be processed by the SoC processor 406. The SoC processor 406 accesses the memory 410 and creates and manages the descriptors. The DMA engines move data packets in and out of the memory 410 as needed.

The SoC processor 406 and the memory 410 are external to the integrated circuit 404 to support the processing of non-time sensitive functions while the processing of time-sensitive functions is handled. Accordingly, the SoC processor 406 and memory 410 may be used to minimize the amount of processing required at the chip level (e.g., packet level). That is, non-time sensitive functions that require additional processing complexity may be passed from the integrated circuits 404 to the subassembly 402. Different types of memories may be used for the memory 410, including double data rate (DDR) memory, flash memory, etc. The memory interface 408 may be provided as an interface corresponding to the memory 410 (e.g., a DDR memory interface, flash memory interface, etc.). The subassembly 402 may further include additional components, such as a debugging port (e.g., a joint task action group (JTAG) port), a receiver and/or transmitter (e.g., a universal asynchronous receiver/transmitter (UART)), or an input/output interface (e.g., a general purpose input/output (GPIO)).

As shown in FIG. 4, the integrated circuit 404 may be a GPON chip 404 coupled to the subassembly 402. Further disclosure of the GPON chip 404 is provided by way of example below. Generally, the GPON chip 404 includes an internal processor, and an SoC interface to the SoC subassembly 404 which interfaces with the SoC processor and with the memory 410 via the memory interface 408. It should be understood that while the architecture 400 is described with reference to particular components, integrated circuits and particular transmission standards, the architecture 400 may be readily applied to different components and standards where time-sensitive and non-time sensitive functions may be applicable, including, but not limited to, wireless and wireline technologies. In the context of an OLT 102, the GPON chip 404 further includes a receiver for receiving upstream burst transmissions from an ONT/ONU, a transmitter for assembling and transmitting downstream transmissions to the ONTs/ONUs and an optoelectronic interface to the passive optical network 100. In the context of an ONT 104 or ONU 106, the GPON chip 404 includes a receiver for receiving downstream transmissions from an OLT 102, a transmitter for assembling and transmitting upstream transmissions to the OLT 102 and an optoelectronic interface to the passive optical network. The internal processor of the OLT 102 may therefore be used to perform time-sensitive functions associated with the OLT 102, such as assembling the overhead field 202 of a downstream transmission along with functions associated therewith, and processing the overhead field 302 of an upstream transmission along with the functions associated therewith. Likewise, the internal processor of an ONT 104 or an ONU 106 may be used to perform time-sensitive functions associated with the ONT/ONU, such as assembling the overhead field 302 of an upstream transmission along with functions associated therewith, and processing the overhead field 202 of a downstream transmission along with the functions associated therewith. In the example provided below, the GPON chip 404 is described with reference to the upstream and downstream GPON transmission convergence frame formats discussed above. However, it is noted that the inclusion of an internal processor in the GPON chip 404 not only allows for execution of time sensitive functions, but also provides the flexibility to adapt the GPON chip 404 to changes in the GTC frame formats and other related GPON functions including MAC, etc.

Although the architecture 400 is shown to include a GPON 404 chip that interfaces with the passive optical network 100, it should be understood that different integrated circuits may be utilized in the architecture 400. For example, the architecture may further include an Ethernet switch interface circuit coupled to an Ethernet switch for monitoring and redundancy, a system packet interface layer 3 (SPI-3) circuit, a synchronous optical network, etc. Other layers may also be supported by the architecture. Generally, whenever a division of the time sensitive versus non-time sensitive functions is desired, each integrated circuit included in the architecture 400 may include an internal processor for execution of the time sensitive functions and an SoC interface to forward data packets for non-time sensitive functions to the sub-assembly 402 for execution therein.

Figure 5A:
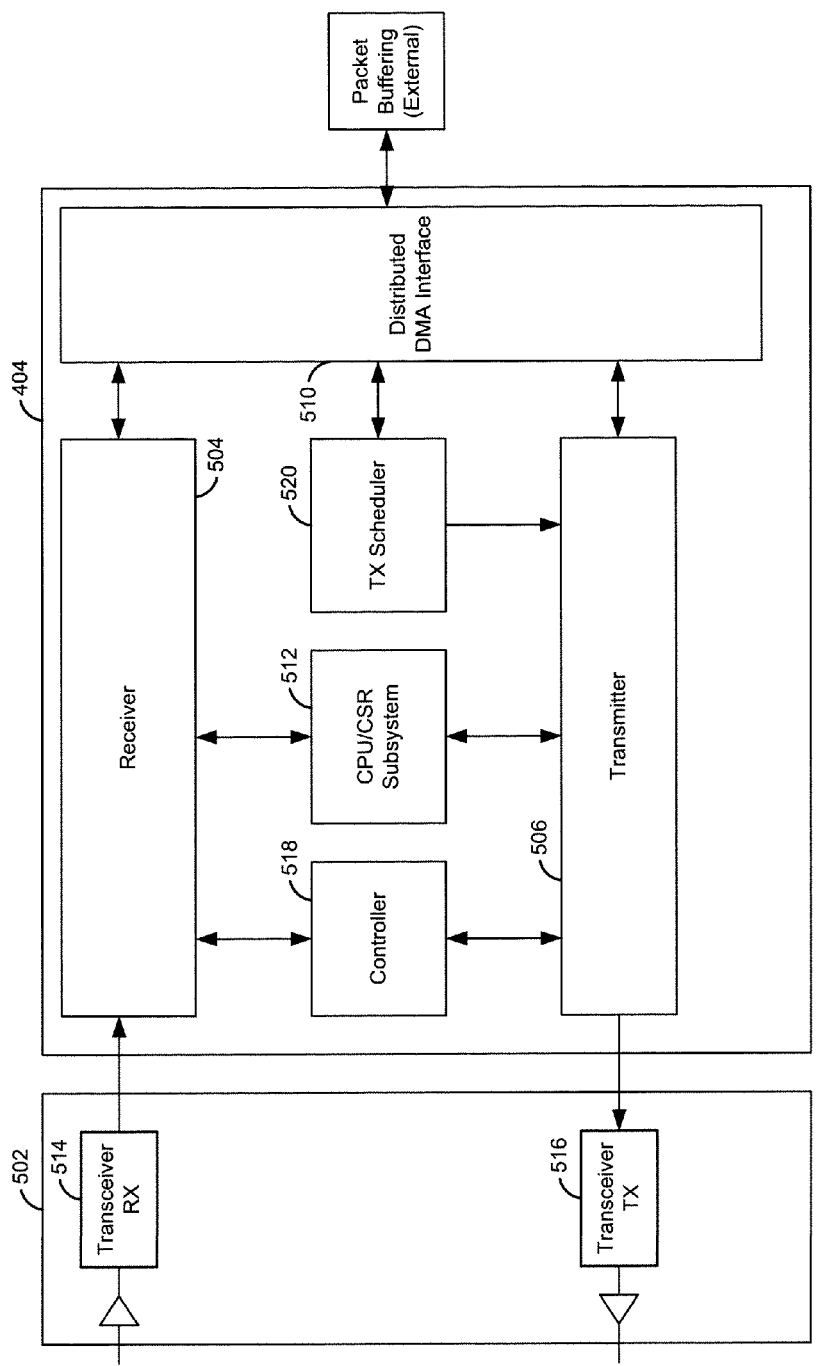
FIGS. 5A-5B are block diagrams of an example gigabit passive optical network chip of the integrated circuit within the passive optical network device shown in FIG. 4.
Figure 5B:
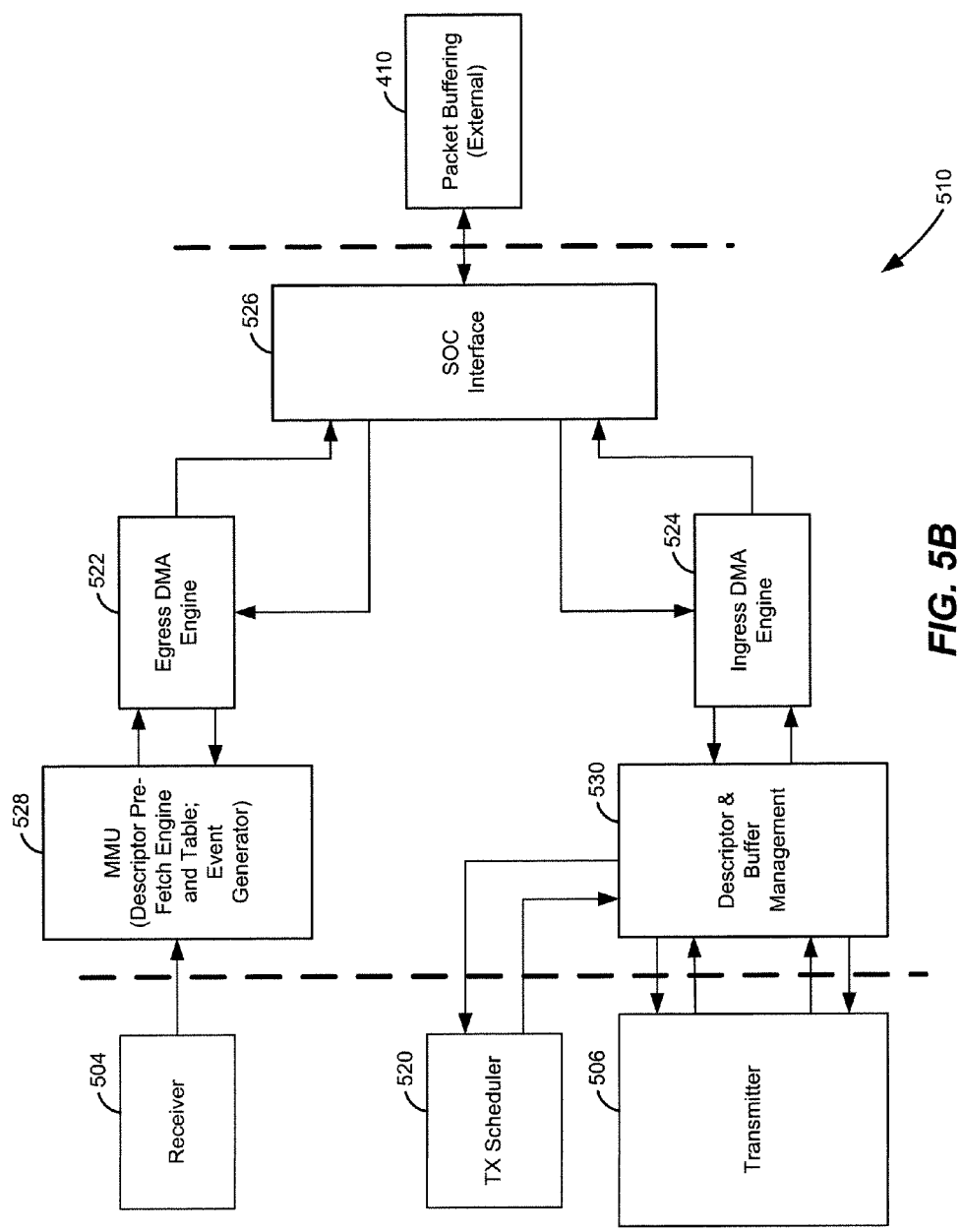

FIGS. 5A and 5B are block diagrams of an example of a general GPON chip 404 that may be used for an OLT 102, an ONT 104 or an ONU 106 shown in FIG. 4, and will be described in the context of the GTC frame formats discussed above. In particular, the GPON chip 404 is coupled to the passive optical network 100 via an optoelectronic transceiver interface 502, and includes a receiver 506 for receiving transmissions over the passive optical network 100, a transmitter 508 for assembling and transmitting transmissions over the passive optical network 100, a distributed direct memory access (DMA) interface 510 to interconnect with the subsystem 402, and an internal processor 512 for processing time-sensitive functions associated with the transmission, such as processing the overhead of a transmission and assembling the frame of a transmission.

The optoelectronic interface 502 generally includes an optoelectronic transceiver receiver 514 coupled to the receiver 504, and an optoelectronic transceiver transmitter coupled to the transmitter 506, although it should be understood that different optoelectronic interfaces may be used. The receiver 504 and transmitter 506 generally conform to the transmission format used by the OLT 102, the ONT 104 and the ONU 106, such as the upstream and downstream GTC frame formats provided above. In the case of an OLT 102, upstream GTC frame formatted data is transmitted from the ONT/ONU 104, 106 over the fiber 110, 112 into the transceiver 514 and is provided to the receiver 504, and downstream GTC frame formatted data is transmitted from the transmitter 516 to the transceiver 516 for transmission over the fiber 110, 112 to the ONT/ONU 104, 106. Likewise, in the case of an ONT 104 or an ONU 106, downstream GTC frame formatted data is transmitted from the OLT 102 over the fiber 110, 112 into the transceiver 514 and is provided to the receiver 504, and upstream GTC frame formatted data is transmitted from the transmitter 516 to the transceiver 516 for transmission over the fiber 110, 112 to the OLT 102.

In particular, the GPON chip 404 further includes a controller 518, which may be a downstream bandwidth (DSBW) controller for an OLT 102 or a transmission framing controller for the ONT/ONU 104, 106, which interacts with the transmitter 506 and the internal processor 512 to control the transmissions of the transmitter 506. Generally, the controller 518 and the internal processor 512 enable various functions of the receiver 504 and the transmitter 506. For example, the internal processor 512 may be used to determine errors in the communication link between the OLT 102 and the ONT/ONU 104, 106, process or provide instructions related to PLOAM messages, perform functions related to PLOAM messages, allocate bandwidth, dynamic ranging and power transmission levels adjustment.

As further seen in FIG. 5A, the transmitter 506 is coupled to a scheduler 520, the controller 518 and the internal processor 512. The schedule 520 may be a downstream transmission scheduler for an OLT 102 or an upstream transmission scheduler for the ONT/ONU 104, 106. Generally, the schedule 520 may be used for traffic shaping, bandwidth allocation and head-of-line (HOL) arbitration.

The distributed DMA interface 510 provides distributed management of the packet buffer (e.g., external memory 410). In particular, the distributed DMA interface 510 provides an interface to the sub-assembly 402, and may be implemented in any integrated circuit 404. Referring to FIG. 5B, the distributed DMA interface 510 includes an egress DMA engine 522 and an ingress DMA engine 524. The egress DMA engine 522 and ingress DMA engine 524 are coupled to an SoC interface 526. The egress DMA engine 522 is able to write data directly to the external memory 410 via the SoC interface 526. The ingress DMA engine 524 is able to read data directly from the external memory 410 via the SoC interface 526. As discussed above, the SoC processor 406 is responsible for non-time sensitive functions, the data of which is moved in and out of the memory 410 for processing by the SoC processor 406, and which may be provided from or provided to the integrated circuit 404 as needed. The DMA engines 522, 524 thereby provide DMA processing via CPU 406 control of the sub-assembly 402.

In the context of the GPON chip 404 of FIGS. 5A-5B, data written by the egress DMA engine 522 is provided by the receiver 504 via a memory management unit (MMU) 528. The MMU 528 and egress DMA 522 are provided with the responsibility of moving the information to the external memory 410. The MMU 528 performs descriptor pre-fetching for incoming data packets, maintains a lookup table to determine the destination location of a data packet in the memory 410 and generates events for reporting to the subassembly 402. Generally, the egress DMA engine 522 notifies the MMU 528 when it is ready to read data, and the MMU 528 manages access of the egress DMA engine 522 to the external memory 410 and provides the data to be written to the external memory 410.

Data read by the ingress DMA engine 524 is provided to the transmitter 506 via a descriptor and buffer management unit 530. The descriptor and buffer management unit 530 may provide frame status data to the scheduler 520, and may be controlled by the scheduler 520. Generally, the descriptor and buffer management unit 530 manages access of the ingress DMA engine 524 to the external memory 410. In particular, ingress DMA engine 524 notifies the descriptor and buffer management unit 530 when it is ready to receive data for transmission, and the descriptor and buffer management unit 530 notifies the ingress DMA engine 524 it is ready to receive the data.

The distributed DMA interface 510 is provided with sufficient memory within the GPON chip 404 to pass information in and out of the GPON chip to a larger external memory by virtue of the MMU 528 and the descriptor and buffer management unit 530. In particular, the GPON chip 404 is able to pass data associated with memory-intensive and/or processor-intensive functions that have low time sensitive requirements (e.g., client payload data) to the external SoC processor 406 and memory 410, and reserve the internal processor 512 for time-sensitive functions, such as processing upstream transmission frame and assembling downstream transmission frames.

Figure 6:
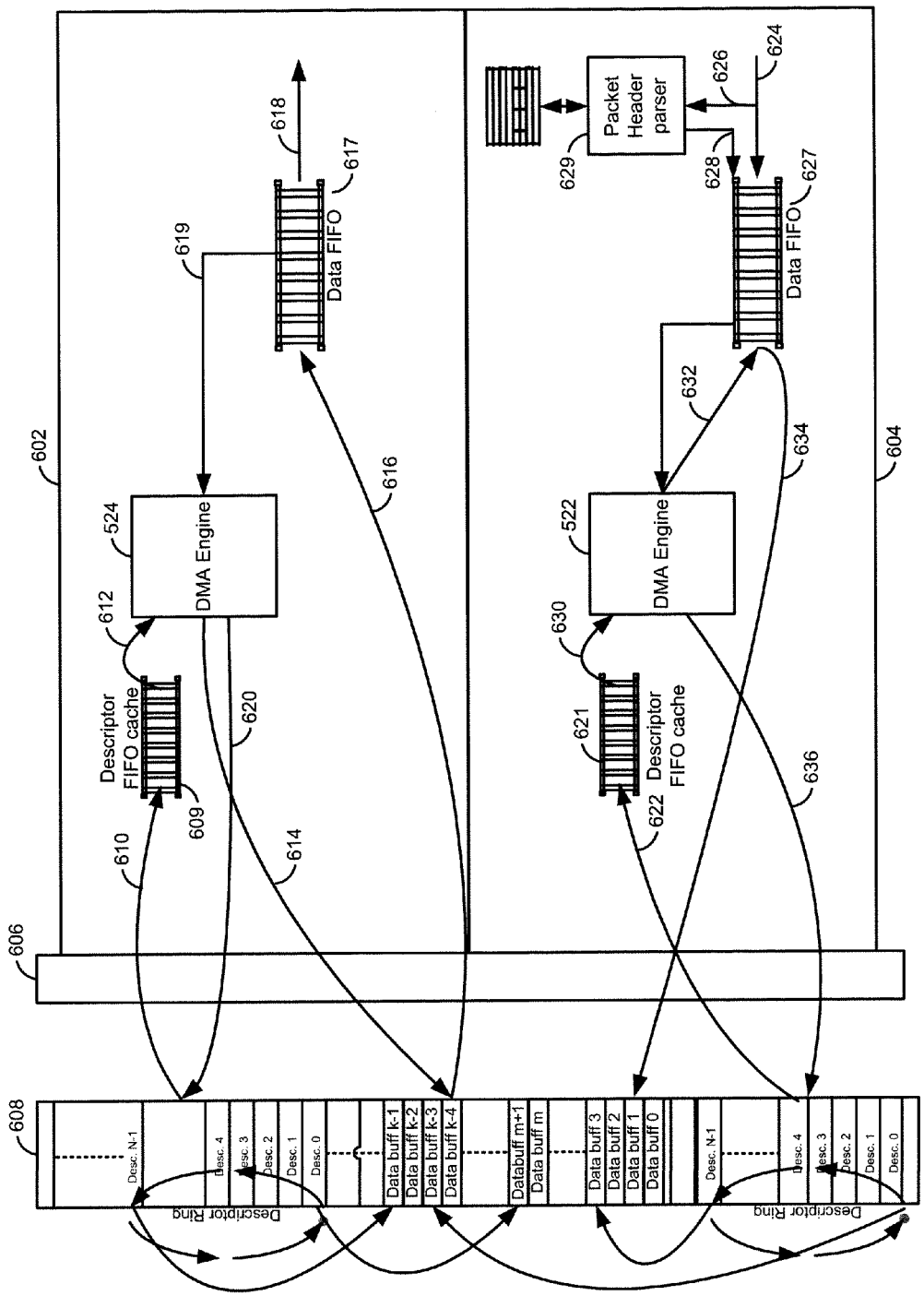
FIG. 6 is a block diagram of an example of buffer management and handling of data packets between a receiver or transmitter and a host.

FIG. 6 is a block diagram depicting an example of buffer management and handling of data packets between a receiver 504/transmitter 506 and a host, such as the subassembly 402. Although the following discusses buffer management and data packet handling in the context of passive optical network and in particular in the context of gigabit passive optical networks, the disclosure is not limited thereto and the buffer management and data packet handling may be applicable to any situation in which descriptors are used to move data in and out of memory.

Referring to FIG. 6, an example of a transmit data path 602, a receive data path 604 and a control plane 606 are shown. Generally, the transmit data path 602 and the receive data path 604 are described in the context of a hardware implementation, such as the distributed DMA interface 510, whereas the host is described in the context of a host memory, such as the external memory 410, one or more processors, such as the SoC processor 406, and software associated therewith, such as a software driver. As discussed below, the buffer management and handling of data packets is performed as a series of writes, as opposed to a series of reads, between the host and the hardware in order to reduce latency for both transmission and receiving operations.

The control plane 606 may include function blocks including a bus interface unit, a Synchronous Static Random Access Memory (SSRAM) interface, event queuing, timers, configuration and status registers, and an Electronically Erasable Programmable Read Only Memory (EEPROM) interface. The bus interface unit may be an SoC bus interface. The SSRAM interface may interface to the external memory 410, such as an external zero bus turnaround (ZBT) memory or an SSRAM, a double data rate (DDR or DDR-II) SSRAM, etc. Generally, the SSRAM interface may support up to 16 Mbytes of SSRAM using a 64-bits data bus and support byte parity. The SSRAM interface may also include buffer table, transmit descriptor cache and receive descriptor cache data structures. Event queuing generally manages event queues, discussed further below, stores event queue pointers, queues events and writes to the host memory. The timers may include 32 timers programmed by software that generate events when time expires, as also discussed below. The configuration and status registers may be high-level registers that do not belong to any other particular block and may contain GPIO and LED logic. The EEPROM interface may allow hardware parameters to be stored and loaded.

The transmit data path 602 may include functional blocks including transmit queuing, transmit data, transmit descriptor cache and transmit events. The transmit queuing includes data transmission caches (e.g. DATA FIFOs) and descriptor cache (e.g. FIFO cache). The transmit data block may manage data writing into the caches, and may include a DMA controller, data multiplexing and cache write controllers. The transmit cache block may include a cache for each DMA engine with a different DMA engine for each type of data packet (e.g., for each type of T-CON), although it is noted that only one DMA engine is shown in the transmit data path 602. The transmit of the block may include a transmit event generator.

The receive data path 604 may include function blocks including receive packet processor, receive filter, receive descriptor cache, and receive data control. The received packet processor block may classify and process received data packets based on the data packet Port-ID, as discussed further below. The receive packet processor block may further generate events if the data packet contains errors, as also discussed further below. The receive filter block may receive the Port-ID filtering and lookup, and may contain a filter/lookup table and perform hashing and searching to identify the destination associated with the Port-ID. The receive cache block may include a data reception cache (e.g. receive data FIFO) with control word. The receive data control block may include a receive data controller and may manage descriptor caches and buffer (e.g. FIFO cache).

Referring to the transmit data path 602, a host software driver is aware of the number of data packets to be transmitted, and the host memory includes a descriptor ring having a descriptor for each data packet to be transmitted. In the case of large data packets, the data packet may be fragmented with a descriptor associated with each data packet fragment. The host software is able to access the blocks shown in the transmit and receive data paths 602, 604 through a Bus Interface Unit (shown as 606) and to/from the blocks.

Knowing the number of data packets to be transmitted, the host 608 writes the descriptors of the corresponding data packets for transmission to a descriptor ring cache, shown in the transmit data path as a Fast In Fast Out (FIFO) cache 609. In particular, the host 608 pushes in the descriptors into the descriptor ring cache 609 through path 610. In one example, the host 608 may push in the entire descriptor ring, including all descriptors therein, associated with a particular data transmission queue, as discussed further below.

The DMA engine 524 reads the descriptors from the descriptor ring cache 609 (see path 612) and deciphers the location of the associated data packet in the host memory, the size of the data packet and any transmission priority associated with the data packet. For example, data packets that may require transmission in real-time, such as audio or video data packets, may receive a higher transmission priority than Internet data packets. Thereafter, the DMA engine 524 activates direct memory access to the host memory and initiates a buffer query to the host 608 (see path 614) whereafter the DMA engine 524 writes the data packet(s) corresponding to the descriptor(s) read from the descriptor ring cache 609 to a transmission data buffer 617, shown in FIG. 6 as a data FIFO.

The DMA engine 524 writes the requested data packet(s) to the transmission data buffer 617 (see path 616). The transmission data buffer caches the data packet written from the host memory and processes (e.g. transmits) the cached data packet out of the data transmission buffer (see path 618). In the event a data packet is received having a higher priority than a previous data packet being cached in the data transmission buffer, the hardware may interrupt transmission of the previous data packet, for example by implementing DMA arbitration. Alternatively, the data transmission buffer may be provided as multiple data transmission buffers, each associated with a particular priority such that a data packet is written to the appropriate data transmission buffer according to its transmission priority.

The data transmission buffer 617 updates the DMA engine 524 as to the status of the buffer via the path 619. In particular, after a data packet has been processed (e.g. transmitted) the DMA engine 524 generates return pointers that are written to the host memory (see path 620). The return pointers indicate that the descriptor has been read from the descriptor ring cache and the corresponding data packet has been transmitted.

In order to reduce traffic between the hardware and the host 608, the return pointer may refer to the last descriptor read from the descriptor ring cache. Because descriptors within a descriptor ring are consecutive, and because the host 608 writes the descriptors to the descriptor ring cache, the host 608 is aware of the last descriptor that may be read from the descriptor ring cache. As a result, the host 608 is able to read the return pointer referring to the last descriptor read from the descriptor ring cache and understand that all descriptors have been read from the descriptor ring cache, and the host understand exactly how many data packets have been processed as a result. Accordingly, the host 608 may push new descriptors into the descriptor ring cache. Alternatively, a return pointer may refer to a batch of descriptors or return pointers for each descriptor may be batched and returned to the host 608. As discussed further below, events may be generated by the hardware, including an event to write the return pointers to the host 608.

Referring to the receive data path 604, the host pushes descriptors of a descriptor ring from the host memory into a descriptor ring cache 621 via path 622, shown in the received data path as a FIFO cache. In one example, the receive data path 604 may include several descriptor ring caches, each corresponding to a different transmission rate (e.g., different bandwidths), in order to accommodate data packets having different transmission requirements (e.g., priorities). Each descriptor ring cache 621 may then correspond to a receive queue within the host memory.

Upon receiving a data packet (see path 624), a parser block 629 parses the header of the data packet (see path 626) in order to determine a destination within the host memory for the data packet (e.g., a data reception queue). In the case of multiple descriptor ring caches, the hardware may also determine the appropriate descriptor ring cache for the data packet based upon its destination within the host memory. In particular, a Port identification (e.g., Port ID 274) may be read from the header and a lookup table may be utilized to match the Port identification with the data packet's destination (e.g., Queue ID), based on the assumption the destination is able to receive the data packet. Once the destination has been determined, the destination data along with the header are cached in the data reception buffer 627 via path 628. In one example, the destination data and the header are cached in the data reception buffer 627 simultaneously with the data packet received along path 624.

The data reception cache 627 periodically updates the DMA engine 522 with its status. The DMA engine 522 will read a descriptor from the descriptor ring cache. According to the descriptor, the DMA engine 522 reads the data from the data reception buffer 627 via path 632, and the data packet is written to the host memory according to its destination via direct memory access (see path 634). Once the data has been written to the host memory, the DMA engine 522 triggers an event to write a return pointer to the host 608 indicating that the data packet has been written to the host memory (see path 636). As a result, the host 608 does not need to read the data from the data reception buffer, but may be notified once the data has been written to the host memory.

At the same time the data packet is written to the host memory, the DMA engine 522 may check the integrity of the data packet by including a CRC block reading a checksum value from the header of the data packet. If the DMA engine 522 determines that there is anything wrong with the data packet, an event may be generated and sent to the host 608. Accordingly, the host 608 may be informed of any problems associated with the data packet as the data packet is received and they process the data packet accordingly without being burdened with the processing requirements associated with evaluating the integrity of the data packet.

Every data packet that is received has a destination within the host memory, which is determined upon receipt of the data packet in the receive transmission path 604. As such, the receive transmission path 604 may include a receive filter block for data packet filtering and parsing the header of the data packet to determine the data packet's destination and determine the data packets requirements. Generally, the receive filter provides hardware de-multiplexing which allows incoming packets to be delivered safely to destinations within the host memory (e.g., pre-configured data reception queues or buffers) based on the port ID of the data packet header. The filtering may act solely on the port-ID of the incoming data packet and may send no-match or wrong port-ID to a default reception queue in the host memory. In one example, a series of filter table lookups are conducted by hashing until the maximum number of lookups is reached. If a matched entry is found, the Queue ID is returned. Otherwise, the Queue ID for a default queue may be used for sending the packet to the default queue.

Figure 7:
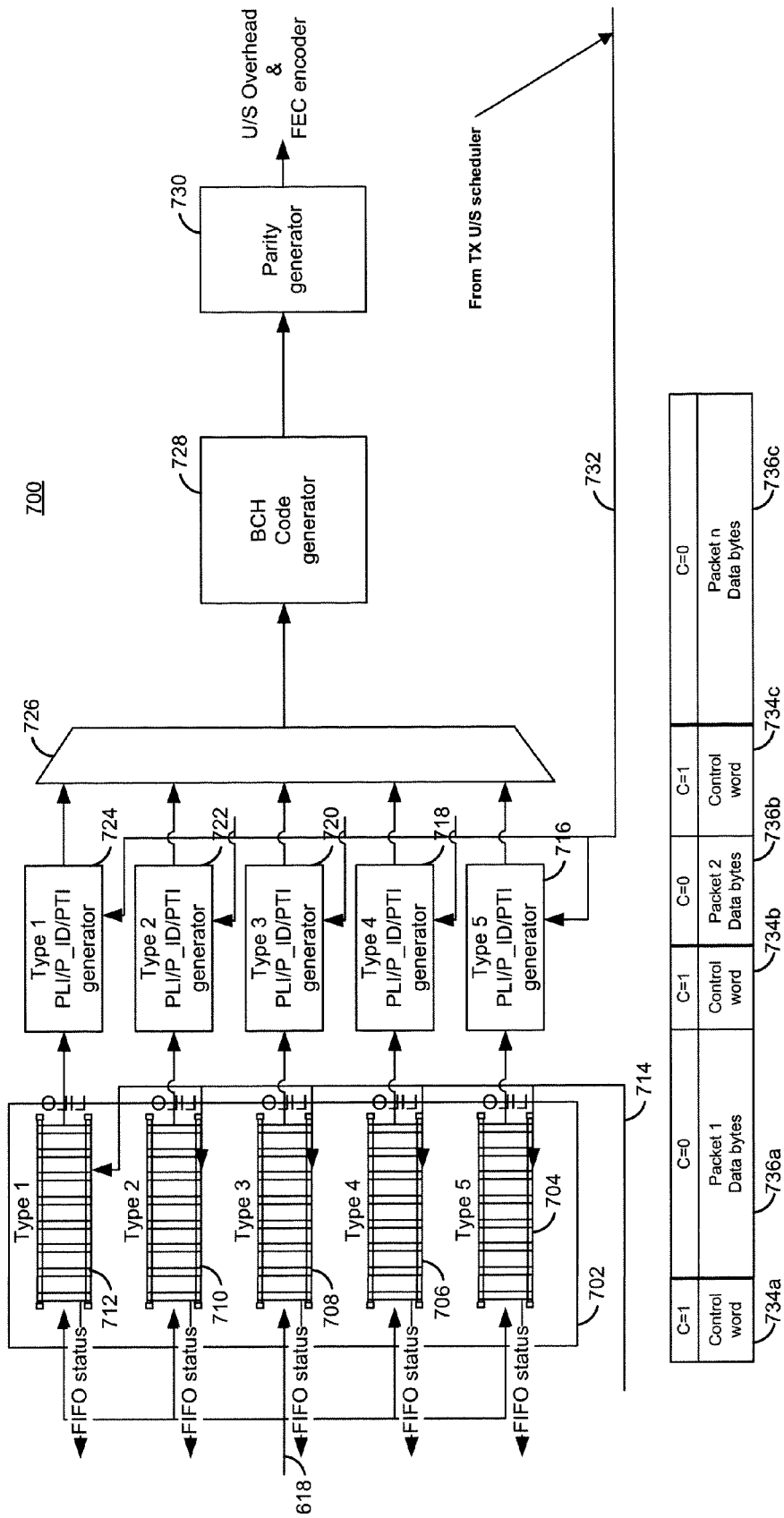
FIG. 7 is a block diagram of an example implementation of the buffer management of FIG. 6 in a transmitter of an passive optical network device.

FIG. 7 is an example configuration 700 of the transmitter path 602, in which a data transmission buffer 702 buffers data from the host 608, for example as the data transmission buffer 617. The DMA engine 524 moves the packet data to the buffer 702 in response to the descriptors from path 612. The buffer 702 may be a single memory unit, such as a SRAM, or it may reflect multiple different memory units in parallel. In the illustrated example, the buffer 702 includes 5 different T-CONTs in the form of five different memory caches, i.e., FIFOs 704-712 in the illustrated example, which are listed as Type 5-Type 1, respectively, and in accordance with the ITU recommendations G.983.4 and G.984.3, and as generally discussed above. The Type 1 T-CONTs represents T-CONTs having a fixed bandwidth, exclusively and cyclically allocated with a fixed rate and controlled cell transfer delay, and are able to accommodate any ATC/QoS. Type 2 T-CONTs are characterized by assured bandwidth, where a fixed average bandwidth is allocated, and are able to accommodate any ATC/QoS classes, with the exception of the non-real time service of class 1. Type 3 T-CONTs have both assured and non-assured bandwidth, the former only when it has cells at a rate equivalent to the assured bandwidth or higher. Non-assured bandwidth is allocated across the T-CONTs requesting additional bandwidth beyond that currently allocated. The sum of the assured and non-assured bandwidth should not exceed a maximum bandwidth. Type 3 T-CONTs accommodate variable bit rate transmissions having QoS classes with the exception of class 1. Type 4 T-CONTs have a "best-effort" bandwidth and do not have any guaranteed bandwidth, e.g., bandwidth that has not been allocated as Fixed, assured, or non-assured bandwidths. Type 5 T-CONTs are a superset of all of the other T-CONT types and may accommodate any ATC/QoS, and may have fixed bandwidth, assured bandwidth, non-assured bandwidth, best-effort bandwidth, and maximum bandwidth.

In the configuration 700, the DMA 524 moves packet data to the FIFOs 704-712 according to descriptor pointers and priority data. The DMA engine 524 monitors FIFO status data via the path 619 that indicates the status of the FIFO. That status may include the rate at which packet data is being stored in each FIFO, as well as whether the FIFO has reached a high usage threshold level, indicating that the FIFO is approaching bandwidth capacity beyond which packet errors and QoS problems could arise.

In response, the DMA engine 524 may perform rate control management to achieve a desired operation of the FIFOs 704-712. The DMA engine 524 may be programmed to dynamically control the buffer 702 allocating different bandwidth to each of the FIFOs 704-714 as needed. For example, after an initial allocation of bandwidth from an OLT, the DMA engine 524 may identify which of the FIFOs 704-712 require additional bandwidth for example because of status data indicating the FIFO is above a high usage threshold. In an ONU/ONT configuration, the ONU/ONT may request additional bandwidth allocation from the OLT, which the OLT may grant through the US BW field 216 identified for the particular T-CONT through the Alloc_ID 244. Bandwidth allocation may be FIFO (or T-CONT) specific, however, the bandwidth allocation to one of the FIFOs 704-712 may come from un-used bandwidth allocated to another of the FIFOs 704-712, for example, when another FIFO's status data indicates that it is operating below a low usage threshold set for the FIFO. It is noted that the DMA engine 524 may Set the high and low usage thresholds for each FIFO and in response to the type of FIFO and QoS requirements for that FIFO. The re-allocation of bandwidth is achieved to improve QoS and may be achieved by the DMA engine 524 exclusively or through requests to the OLT. Each of the FIFOs 704-712 may have its own QoS priority that is used to control bandwidth allocation and data transmission more generally.

In the illustrated configuration, the FIFOs 704-712 operate as virtual caches that indicate the status of data congestion through the FIFO, and from the host 608 and through the transmitter 602, more generally. Most of the packets or payloads are stored in the host memory 608 or external buffer until the upstream traffic starts and the FIFOs 704-712 become available.

The DMA engine 524 may dynamically set the high usage and low usage thresholds for the buffer 702, and each FIFO 704-712, and thereby control the point at which the FIFOs 704-712 are made available to read in more data. The FIFO thresholds may be transmitted to the FIFOs 704-712 through a path 714. By segmenting the buffer 702 into a plurality of different FIFOs 704-712, the DMA engine 524 may dynamically control the high and low thresholds for each FIFO, making each of them different from the other or some or all the same as desired. Additionally, the size of each of the FIFOs 704-712 may be different and dynamically adjusted by the DMA engine 524 to align with the bandwidth allocation from the OLT, which among other things will allow traffic management systems to operate more efficiently and with lower latency.

Each FIFO 704-712 is coupled to a separate header generator 716-724, which adds a header field to the packet data from the corresponding FIFO prior to combination of the signals from each of the FIFOs 704-712 in a multiplexer 726. The output from the multiplexer 726 is a transmitter allocated multiplexed data sent to a BCH code generator 728 to achieve cyclic error correction on the receiver side. Data from the BCH code generator 728 is provided to a parity generator 730 prior to being merged with an upstream or downstream header (depending on the application and the type of optical network device) and FEC encoded for transmission on the PON.

Each header generator 716-724 receives a control signal on path 732 from the transmission scheduler, such as the scheduler 520. The control signal may include a transmitter ready payload signal and a transmitter buffer counter signal to identify which counter is to transmitter at a particular time.

The header generators 716-724 may generator control words 734 associated with and identifying data packets 736 from the various FIFOs 704-712. In a GPON configuration, the generators 716-724 may generator different control words 734a-734c for each packet data 736a-736c. In an OLT configuration, the control words may include data indicating the start of a payload/packet, the end of a payload/packet, Port ID, byte count and a PTI field, each generated in the header generators 716-724. Additionally, a PLI field may be generated by the header generators 716-724 and included in the control words 734. These header generators may fully or partially insert headers whether operating in an OLT devices or an ONU/ONT device.

The multiplexer 726 produces an output 738 in the format shown. Each of the payloads 736a-736c may be a different length reflecting the different bandwidth allocations from the OLT to the ONU and as provided by the QoS for the particular T-CONT type.

While five parallel FIFOs 704-712 are shown with five in parallel header generators 716-724, the configuration 700 may be implemented with additional or fewer T-CONT paths and header blocks, including through a single FIFO or similar buffer or cache memory and a single header generator.

Figure 8:
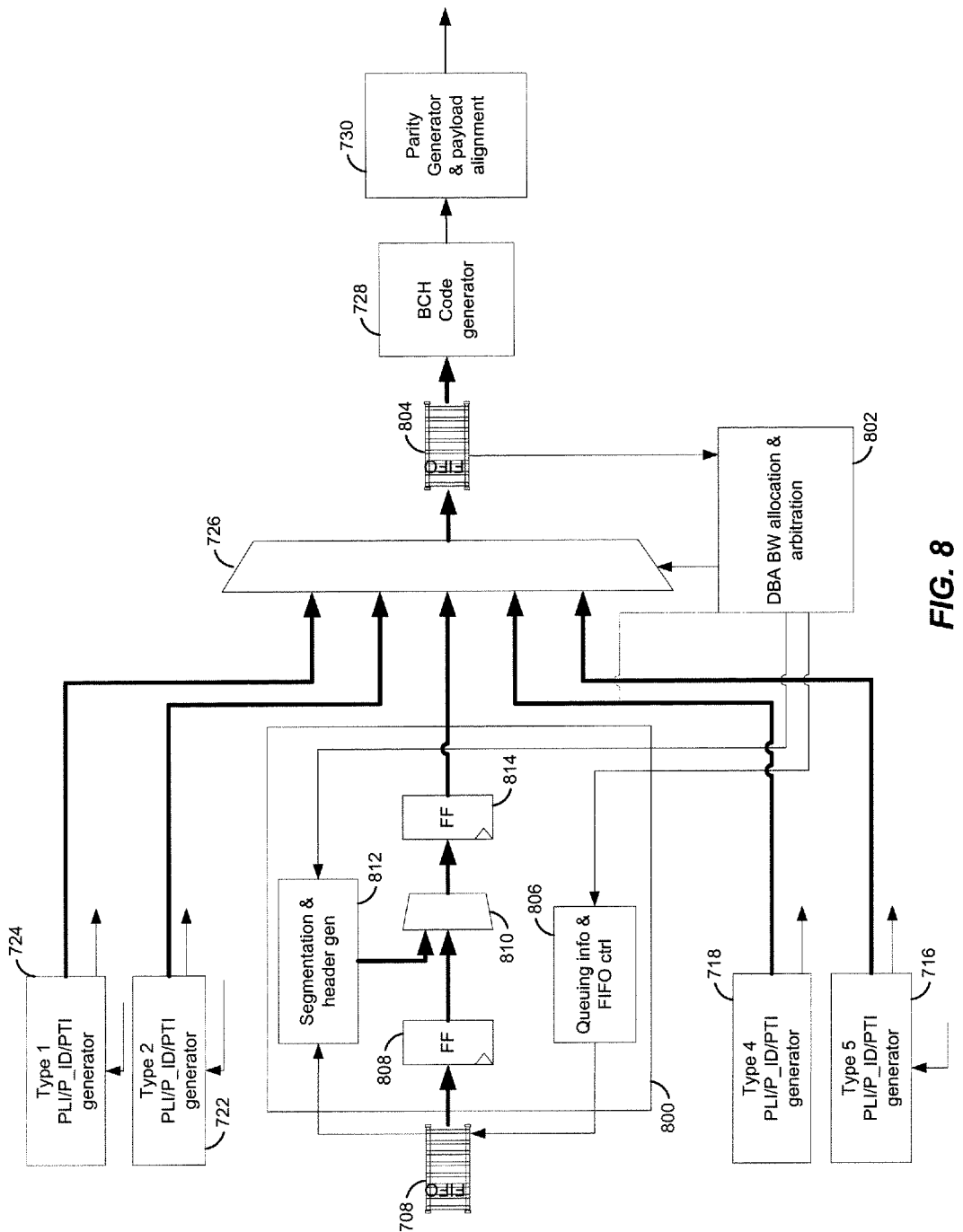
FIG. 8 is a block diagram of an example bandwidth allocation control and header generation for the buffer management implementation of FIG. 7.

FIG. 8 illustrates a detailed example of a header generator 800 that may be used as any of the header generators 716-724. A DBA bandwidth allocation & arbitration block 802 receives bandwidth allocation data, for example, from the OLT, in the form of the US BWmap field 218 in the downstream transmission 200. The allocation may be the initial allocation for each T-CONT from the OLT for example. However, the configuration 700 is dynamically adjustable; therefore the GPON circuit 404 may request additional bandwidth allocation to any of the particular T-CONTs (FIFOs 704-712) through the DBA field 346 in the upstream transmission 300. As discussed above, this DBA field 346 may contain the traffic status of the particular T-CONT. Status reporting DBA may be provided as status indications in the PLOu, in the DBRu as shown in FIG. 3, or in an ONU report in a DBA payload.

The block 802 also receives a status value from a secondary memory cache in the form of FIFO 804 that buffers the output of the multiplexer 726 prior to BCH code generation. The status indicator may identify whether the FIFO 804 is above a high usage threshold indicating that the FIFO 804 is filling up and may, without additional bandwidth allocation or rate control of data flow, fill up and fail to accept new data (control words and packets), resulting in dropped data packets. The block 802 provides the main arbitration to decide how much bandwidth will be allowed according to the DBA algorithm.

In response, the block 802 controls a FIFO controller 806 within the header generator 800 to queue data from the FIFO 708. The FIFO 708 provides the buffered packet data from the host 608 to a first flip flop 808 coupled to a multiplexer 810, itself receiving input from a segmentation and header generator 812. Separately, the DBA BW allocation & arbitration block 802 instructs the generator 812 with data for timing and controlling control word generation, prior to transmission to a second flip flop 814.

The block 802 is coupled to each header generator for arbitration and BW allocation. In this way, the block 802 may control packet data timing at the header generator (e.g., generator 800), allowing higher priority data from the generator and corresponding FIFO to transmit before other, lower priority packet data. The header generators may be dynamically programmable in this way, with each header operating under different bandwidth allocations and being able to separately request bandwidth allocation (e.g., through header fields such as the DBRu field 310).

Though only header generator 800 is described, it will be understood that each of the header generators may be coupled to the allocation & arbitration block 802. Lead lines are shown extending from the generators 716-724 in FIG. 8 and represent the handshaking between these header generators and the DBA arbiter block 802.

Figure 9:
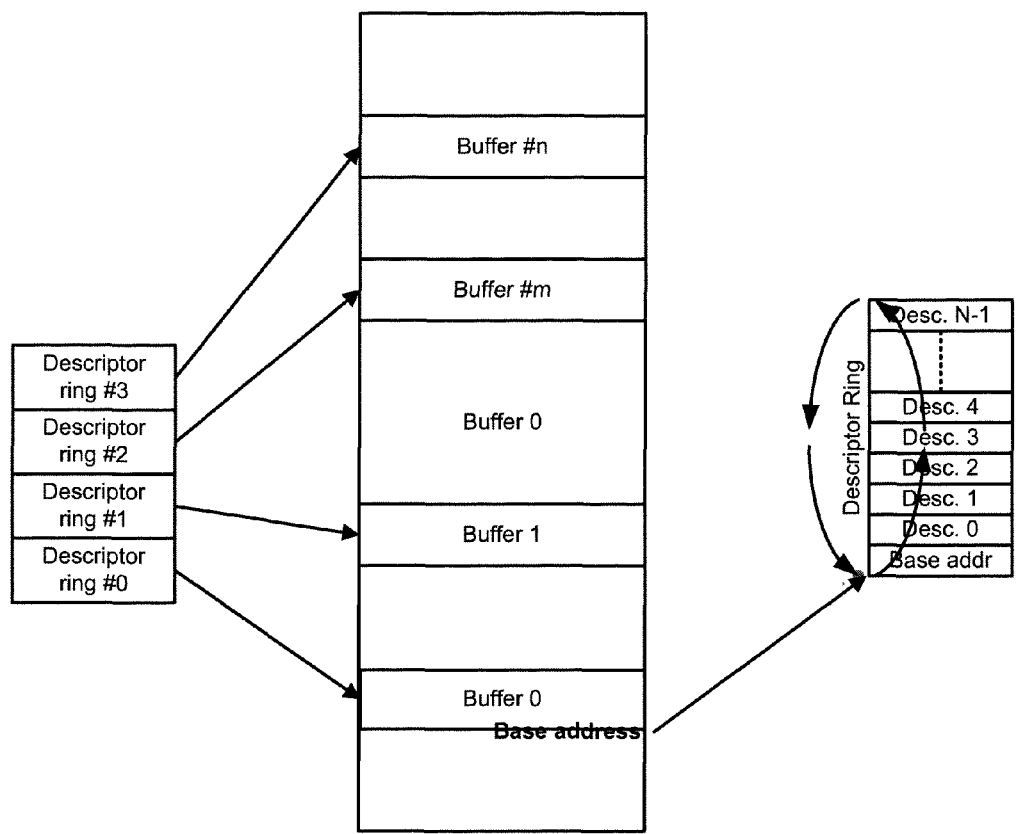
FIG. 9 is a schematic diagram of descriptor queues and descriptor ring structure in a host memory.

Descriptor queues in the host memory may be formed using buffers pointed to by buffer IDs in the buffer table. For large descriptor queue sizes, multiple buffers may be utilized. The buffer IDs used to create a descriptor queue are generally consecutive so that only one buffer ID is passed to hardware, as shown in FIG. 9. In the example shown in FIG. 9, 4 descriptors are shown, each with its own buffer in the host memory. In one example, each buffer in the host memory is a page of 4 k bytes in size.

Although shown in separate data paths, the transmit and receive DMA mechanisms may be provided with similar implementations. The host 608 creates a descriptor ring for each descriptor queue in the host memory. In one example, the size of each ring may programmable up to 1K descriptors. Generally, the host utilizes separate transmit and receive queues. The hardware for the transmit and receive data paths 602, 604 implements a descriptor cache for each DMA queue. A small number of descriptors (e.g., 8, 16 or 32) may be cached, though a cache size of 64 may also be utilized. The cache is used as a descriptor cache and one entry is mapped into that queue's page-aligned address space control.

As discussed above, a method utilizing pushes from the host 608 and hardware physical address calculation is utilizes. The host 608 pushes descriptors to minimize initial latency, and the hardware of the transmit and receive data paths 602, 604 process the descriptors to reduce processor overhead, for example of the SoC processor 406. In particular, the host 608 writes the descriptors into the descriptor ring cache inside the hardware. Batches of descriptors may be pushed in after a batch of descriptors have been set up to further reduce the processor overhead. The hardware, and in particular the DMA engines 522, 524, may be implemented such that they will be alerted when any descriptors are pushed inside the descriptor ring cache. Once alerted the descriptors are read out the descriptor ring cache and DMA operations are initiated.

The host 608 may typically push the descriptors into the descriptor ring cache after a reset (e.g., cache empty event) or after the transmitter/receiver has been idle for a predetermined period of time. However, the host 608 should be informed of the completion descriptor pointers (return pointers) indicating the descriptors which have been consumed by the DMA engines 522, 524 to verify there are available slots in the descriptor ring cache. As such, when the last descriptor is used in either the transmission or reception descriptor ring, the hardware sets a "descriptor queue empty" bit in the completion event. The host 608 may use this to trigger a descriptor and write pointer push when new descriptor(s) become available.

On the receive data path 604, a descriptor queue empty event may also be used as a warning to the host 608 that new data packets destined for the descriptor queue will be discarded. The hardware may not generate any more events regardless of the number of data packets that arrive and get discarded until the host 608 posts a new descriptor. This prevents a burst of data packets from generating enough events to overflow the event queue.

In one example, the transmit descriptors are 8-byte aligned in host memory. The size of the transmit descriptor cache may depend on the number of queues in the host memory and the number of cached entries per queue. In one example, a maximum of 32 entries is supported. With 5 queues, up to 960 bytes are utilized and may reside inside the chip.

As indicated above, different data packets (e.g., different T-CONTs) may have different transmission rates beyond those allowed by the receiving station (e.g., OLT, ONT, ONU). While OLT protocol may handle the upstream burst rate by adjusting the burst window, the following provide an alternative or additional method that helps the T-CONT to generate meaningful DBRu indication to OLT. In particular, a rate control is implemented, which may be implemented in software or hardware. However, it is noted that software-based rate control may add significant overhead, because after sending each packet to hardware, the software would set a timer and wait for the timer to expire before sending another packet. As such, it may be preferable to queue all the packets into hardware to control the packets transmitted out, which may be implemented as a rate control engine.

The rate control engine may manage only a few of the different T-CONTs. The host 608 generally has knowledge of the acceptable packet rate per T-CONT, which may be obtained by analyzing the number of dropped packets and/or by monitoring the arrival rate of responses and acknowledges. The host 608 programs a rate control for each of the queues in the host memory. By default, rate control values may be set to 0 and queues are not rate controlled.

On the hardware side, the hardware logic looks into a queue to determine its transmission rate (e.g., fast/slow) in terms of bandwidth. In particular, the hardware may utilize a lookup table to determine how much delay to associate with each T-CONT. When buffering and handling a data packet for transmission, the hardware pulls data for a descriptor, examines it and if time has not expired the hardware slows down the transmission rate. The hardware may control the flow at the packet level (i.e., the hardware does not break up packets or count bytes for the purpose of rate control) by modulating the inter-packet-gap (IPG) to achieve the right rate control. Generally, the goal is to achieve a minimum IPG, though it is noted that there need not be a maximum IPG constraint. The rate is controlled. Accurate DBRu reporting may be achieved by throttling the DMA engine 524 that reads in the correct amount of traffic (e.g., payload data) according to the pre-configured rate. As such, the data transmission cache stores the "true" amount of traffic and generates the DBRu reports dynamically.

Rate control may be defined as time per packet transmitted. In one example, a 1 microsecond rate control unit may be used, which is equivalent to a 125 byte time in 1 Gigabit. If rate control is utilized due to a rate limit, the host 608 programs the rate control table. When the host 608 updates a descriptor queue write pointer to the transmission queue manager, the transmission queue manager compares the pointers. If there is work to do, the transmission queue manager (block 806) outputs an entry containing the Queue ID to the rate control engine. The hardware then retrieves the rate control value of this queue from the rate control table. Non-rate controlled queues are sent to DMA. When a queue exits the rate control engine, the transmit DMA queue manager processes it according to the flow described in FIG. 10.

Figure 10:
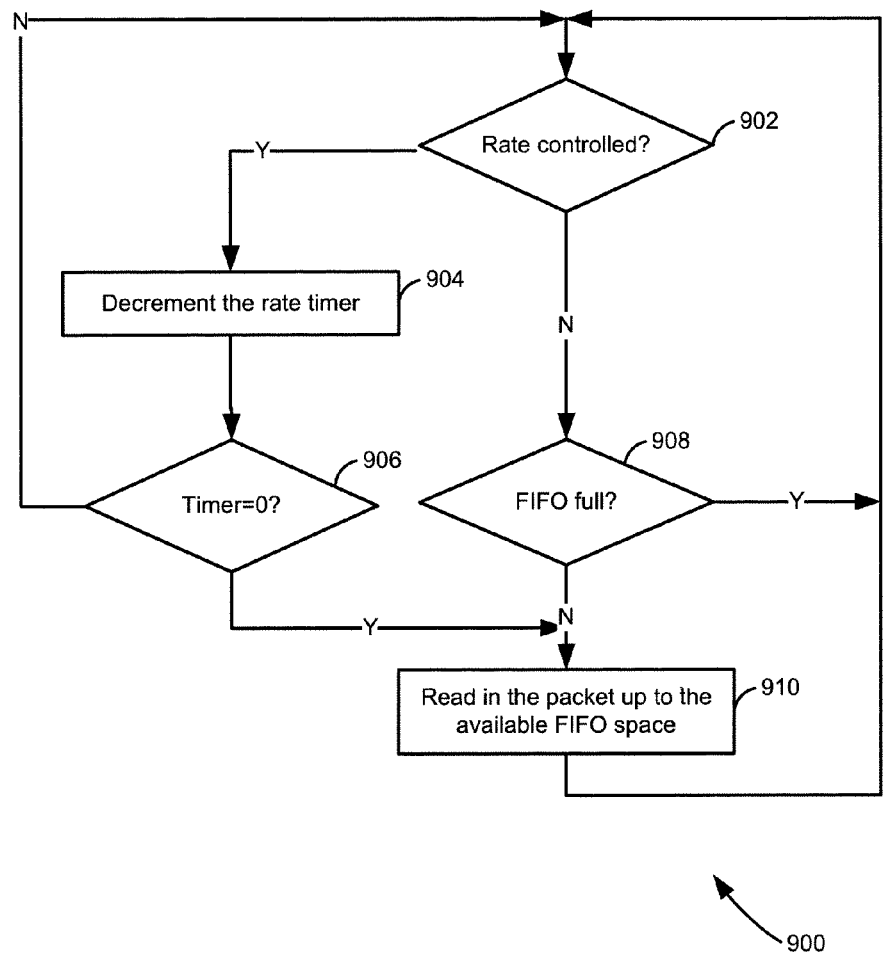
FIG. 10 is a flow diagram of a rate control routine for transmitting data packets.

Referring to FIG. 10, an example of a rate control routine 900 is shown. Beginning at block 902, the routine 900 determines if the queue is rate controlled or not. If so, the routine 900 attempts to minimize the IPG by decrementing a rate counter at block 904 and determines if the time has reached zero at block 906. If not, control returns to block 902 for the next data packet. On the other hand, if the time reaches zero, the minimum IPG has been achieved, and a write request is initiated to the host 608 to write the data packet to the data transmission cache at block 910. If there are multiple packets to transmit, after direct memory accessing each data packet, the queue ID is returned to the rate control engine to be rate controlled again.

Referring back to block 902, if the queue is not rate controlled, the write request is initiated and the data packet is written to the data transmission cache until the cache is full as determined at block 908. In particular, if a queue is not rate controlled and there are multiple data packets to transmit, the transmission queue manager processes all the data packets in the queue.

Because the buffering and handling disclosed herein utilizes a series of writes to reduce internal latency, events are utilized as a reporting method. For example, the host 608 relies on events to know when and how many descriptors have been processed on the transmit data path 602, and uses events on the receive data path 604 to know the integrity of the data packet (e.g., CDC), underflow, overflow, parsing results, type of information, etc. Events are status words gathered from various sources in the hardware, and may generate interrupts when enabled. However, interrupts may be minimized to reduce interrupt latency and processor overhead. Events are written into various locations in the host 608. The locations are organized as event queues in the host memory which wrap around after reaching the top. Generally the number of event queues are kept small (e.g., 4-6). Events are written out by the hardware instead of being read by the host 608 in order to improve event delivery latency and overall bus efficiency. In one example, a maximum of 1K event queues are implemented, where event queues 0 to 3 are dedicated to a maximum of 4 processor queues. Event queues are large enough such that the host 608 can keep up with servicing the queues and the hardware will not overwrite events before they are serviced by the host 608. All event queue entries may be initialized by the host 608 to all zeros, and the hardware writes them with non-zero values. The host 608 clears them to zero after servicing. The host 608 may poll its current location, inside the host memory, to detect whether the queue has over-wrapped.

Based on the above disclosure, the proposed data packet buffering and handling is robust and efficient. For example, descriptors are naturally aligned, such that there is no need to guess the "next pointer", while also saving the extra bits for the next pointer. The descriptors may be "pushed" into hardware cache in batches, thereby saving bus bandwidth and lowering bus activities. After descriptors have been pushed into the hardware, the host may enter a sleep mode until the hardware reports back, waking up the host 608 by either interrupts or a timer, and thereby lowering processor utilization. After descriptors been used or processed, the hardware sends back the pointer that was last used, and the host 608 can flush out all descriptors up to the last reported pointer. This creates a significant increase in efficiency or processing power, especially if the completion vent is batched (e.g., 16 or more descriptors).

Accordingly, the data packet buffering and handling provide a simple and reliable setup between host 608 and hardware for moving user traffic. Fast activation and low latency for is achieved both transmission and receiving operations, by reducing the number of reads and interrupts which slows operations and eliminating the necessity of polling by using writes and push outs.

The buffering and handling further utilizes dynamic and flexible method to accommodate any size of host memory without modification of the hardware configuration. For example, the descriptor ring size may be changed dynamically. A data packet may be fragmented and associated with a chain of descriptors, such that there is no limit in data packet size that may be processed, and several descriptors may be utilized to channel a data packet. The use of a small cache in the hardware as virtual cache may achieve robustness and high performance. That is, when the host 608 creates descriptors, writes are used to push the descriptors into the hardware, which stores a certain size descriptors due to the small cache and processes in real time to move the data in and out of the hardware. Nonetheless, as indicated above, there is no data packet size limitation, because multiple descriptor chains may be used and there is not hard boundary for the descriptors The descriptor ring size may be programmed according to each traffic class (e.g., T-CONT) and bandwidth requirement. Each queue in the host memory may have its own descriptor ring, and the size of the ring is not necessarily the same depending on the type of data packet or the data packet requirements (e.g., slow traffic or low bandwidth traffic may use a small ring versus high bandwidth traffic).

Scattered data buffers may be utilized with multiple descriptors for a single data packet, such that no duplicated data packet copying is required, higher efficiency is achieved with little processor overhead and low latency. Essentially, the host memory is remapped and does not have to be contiguous because have several buffers (queue) may be provided at different locations. The descriptor points to different areas in the host memory. For example, with an IP packet, a new header is created above the older data with another descriptor used and appended to the old data, thereby obviating the need to add a header and CRC to each movement of data. In other words, the hardware is able to take a descriptor from anywhere in the host memory, and does not need to copy the data from one location to another location and add a header and CRC.

Batched transmission/reception completion events reduce the bandwidth requirement for buffer management. Every time the hardware DMA engine is finished with the descriptor, the hardware can either return the descriptor to the host 608 or batch the descriptors and return a pointer for the batched descriptor to the host 608. The host 608 looks into the event queue to see which descriptors have been returned, rather than polling the hardware. In other words, the hardware writes an event back to the host memory and the host checks to see what packets have been returned w/o polling or reading.

The data packet buffering and handling is also suitable for quality of service implementation, using simple "weighted-round-robin" arbitration combined with a rate control scheme to achieve priority and bandwidth control. Because each queue has it own descriptor, logic may be implemented to decide how much opportunity each queue is given to process. For example, to make up for a slow queue (e.g., a slow device associated with the queue), a data packet is processed as determined by the queue's rate of processing. The DMA engine processes the packet at the rate and automatically stores it in the data transmission cache at the desired rate. Further, the use of multiple interrupts batched according to intervals of time helps achieve low latency and high efficiency in a multi-thread, multi-processor system.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method of managing flow control of packet data from a host device to an optical network device for transmission on an optical network, the method comprising: receiving descriptor data from a descriptor ring buffer stored at the host device wherein the descriptor ring buffer stored at the host device includes one or more descriptor rings, wherein each descriptor ring corresponds to a different descriptor queue such that the descriptor data is from one descriptor ring in the descriptor ring buffer;
    storing the received descriptor data in a descriptor cache at the optical network device, wherein the optical network device is external to the host device;
    processing the descriptor data stored in the descriptor cache to identify, from the descriptor data, one or more data packets buffered in the host device;
    analyzing the descriptor data to identify a destination corresponding to one of a plurality of first in first out (FIFO) memories at the optical network device for the identified one or more data packets;
    copying the one or more data packets identified by the descriptor data from the host device to a buffer memory in the optical network device, the buffer memory having i) a first usage threshold of a first value and ii) a memory allocation size of a second value, the buffer memory comprising a plurality of first in first out (FIFO) memories each having a respective FIFO memory allocation size, wherein copying the one or more data packets to the buffer memory comprises writing the one or more data packets to the one of the plurality of FIFO memories;
    monitoring, in the optical network device, usage status of the buffer memory to determine if memory usage is above the first usage threshold; and
    in response to the memory usage being above the first usage threshold, i) increasing, at the optical network device, the memory allocation size of the buffer memory above the second value, and ii) increasing the first usage threshold above the first value.

2. The method of claim 1, wherein each FIFO has a respective high usage threshold, wherein writing the one or more data packets includes
    writing the one or more data packets to at least one of the FIFO memories in response to the descriptor data.

3. The method of claim 2, wherein at least two of the FIFO memories have different FIFO memory allocation sizes.

4. The method of claim 2, wherein increasing the memory allocation size above the second value comprises:
    measuring status data from each of the FIFO memories to identify which of the FIFO memories has a memory usage above the respective high usage threshold for the FIFO memory; and
    resizing the identified FIFO memories by decreasing the respective FIFO memory allocation size of other of the FIFO memories.

5. The method of claim 4, wherein each of the FIFO memories has a respective lower usage threshold, wherein resizing the identified FIFO memories comprises:
    measuring the status data from each of the FIFO memories to identify which of the FIFO memories has a memory usage below the respective low usage threshold for the FIFO memory; and
    decreasing the FIFO memory allocation size of only the identified FIFO memories having the memory usage below the respective low usage threshold.

6. The method of claim 5, wherein:
    the optical network is a gigabit passive optical network (GPON);
    each of the FIFO memories is a transmission container in the GPON; and
    the method further comprises resizing the FIFO memory allocation size of at least one of the FIFO memories in response to the type of transmission container for the at least one of the FIFO memories.

7. The method of claim 2, further comprising:
    providing output data from each of the FIFO memories to a corresponding one of a plurality of header generators; and
    controlling a header generator queue in each of the header generators in response to a bandwidth allocation signal received over the optical network.

8. The method of claim 1, further comprising:
    caching the descriptor data pushed from the host device into a descriptor data cache and processing the descriptor data cached in the descriptor data cache;
    transmitting the one or more data packets out of the buffer memory; and
    writing a return pointer to the host indicating that i) the descriptor data has been read and ii) the corresponding data packet has been transmitted.

9. The method of claim 1, further comprising:
    performing a pre-fetch on packet data to determine a destination location of the packet data; and generating an event for initiating a write request to a distributed direct memory access engine for writing the one or more data packets identified by the descriptor data to the buffer memory in the optical network device.

10. The method of claim 9, further comprising generating the event to indicate at least one of an integrity of the packet data, underflow, overflow, parsing results, or type of information in the packet data.

11. A method of transmitting packet data from a host device, the method comprising:
 pushing descriptor data stored in a descriptor ring at the host device to a descriptor cache at an optical network device external to the host device, wherein the descriptor data is selected from one of a plurality of descriptor rings, wherein each descriptor ring corresponds to a different descriptor queue, wherein the descriptor data includes an indication to a memory location of the packet data stored in the host device;
 writing the packet data to a buffer memory in the optical network device external to the host device in response to a request for the packet data, the buffer memory comprising a plurality of memory caches each is configured to receive a portion of the packet data for transmission, and each memory cache having a bandwidth size; and
 in response to a quality of service warning signal, adjusting the bandwidth size of at least one of the memory caches, such that the bandwidth size of the at least one of the plurality of memory caches is adjustable independent of the bandwidth size of any of the other of the plurality of memory caches, wherein each of the memory caches has a respective high usage threshold and a respective low usage threshold, the method further comprising:
 increasing the bandwidth size of each of the memory caches operating above the respective high usage threshold; and decreasing the bandwidth size of each of the memory caches operating below the respective low usage threshold.

12. The method of claim 11, further comprising:
 measuring status data for each of the memory caches; and
 comparing the status data for each memory cache to a usage threshold for each memory cache to determine if any of the memory caches are operating in a quality of service warning condition, wherein the quality of service warning signal indicates that at least one of the memory caches has status data above the usage threshold.

13. The method of claim 11, further comprising:
 multiplexing an output from each of the memory caches into a secondary memory cache;
 measuring status data for the secondary memory cache to determine a memory usage of the secondary memory cache; and
 determining the quality of service warning signal from the status data of the secondary memory cache.

14. An apparatus for transmitting data packets stored in an external host device memory, the apparatus comprising:
 a descriptor cache separate from the external host device memory, the descriptor cache to store descriptor data pushed to the descriptor cache from the external host device memory, the descriptor data comprising one or more data packet descriptions each corresponding to one of the data packets stored in the external host device memory to be transmitted, wherein the descriptor data is selected from one of a plurality of descriptor rings each corresponding to a different descriptor queue at the host device;
 a distributed direct memory access engine coupled to the descriptor cache, the distributed direct memory access engine to i) process the descriptor data stored in the descriptor cache to read a data packet description from the descriptor data, and ii) based on processing the descriptor data, identify one of a plurality of data packet first in first out (FIFO) memories; and a data transmission buffer comprising the plurality of data packet FIFO memories, the data transmission buffer coupled to the host device memory for the distributed direct memory access engine to write the data packets corresponding to the read data packet description to the one of the plurality of data packet FIFO memories, wherein each of the plurality of data packet FIFO memories has a respective memory allocation size,
 wherein the distributed direct memory access engine is configured to,
 (i) monitor usage status of the data transmission buffer to determine if memory usage is above a high usage threshold for the data transmission buffer, and
 (ii) in response to the memory usage being above the high usage threshold, increase memory allocation size of the data transmission buffer and increase the high usage threshold of the data transmission buffer.

15. The apparatus of claim 14, wherein the cache is a descriptor first in first out (FIFO) memory.

16. The apparatus of claim 15, wherein each of the plurality of data packet FIFO memories is characterized by a respective high usage threshold.

17. The apparatus of claim 16, wherein at least two of the plurality of data packet FIFO memories have high usage thresholds that are different.

18. The apparatus of claim 16, wherein the distributed direct memory access engine is configured to:
 in response to a memory usage of one of the plurality of data packet FIFO memories being above the high usage threshold for the FIFO memory, increase the memory allocation size of the FIFO memory; and
 increase the high usage threshold of the FIFO memory.

19. The apparatus of claim 16, wherein the distributed direct memory access engine is configured to:
 measure status data from each of the plurality of data packet FIFO memories to identify which of the plurality of data packet FIFO memories has a memory usage above the high usage threshold for the FIFO memory;
 decrease the memory allocation size of at least one of the non-identified data packet FIFO memories; and
 increase the memory allocation size of the identified data packet FIFO memories.

20. The apparatus of claim 19, wherein the distributed direct memory access engine is configured to decrease the memory allocation sizes only for the data packet FIFO memories having the memory usage below a low usage threshold.

21. The apparatus of claim 16, wherein the apparatus is a gigabit passive optical network (GPON) device and each of the FIFO memories is a type 1, type 2, type 3, type 4, or type 5 transmission container.

22. The apparatus of claim 21, wherein the GPON device is an optical network unit, an optical network termination, or an optical line termination.

\* \* \* \* \*